United States Patent
Chen et al.

(10) Patent No.: US 10,824,255 B2
(45) Date of Patent: Nov. 3, 2020

(54) MANUFACTURING METHOD OF TOUCH PANEL

(71) Applicant: HANNSTAR DISPLAY CORPORATION, Taipei (TW)

(72) Inventors: Chih-Wei Chen, Tainan (TW); Mei-Ling Chou, Tainan (TW); Yao-Chih Chuang, Tainan (TW)

(73) Assignee: HANNSTAR DISPLAY CORPORATION, Taipei (TW)

( * ) Notice: Subject to any disclaimer, the term of this patent is extended or adjusted under 35 U.S.C. 154(b) by 0 days.

(21) Appl. No.: 16/711,438

(22) Filed: Dec. 12, 2019

(65) Prior Publication Data
US 2020/0117291 A1    Apr. 16, 2020

Related U.S. Application Data

(63) Continuation of application No. 15/952,251, filed on Apr. 13, 2018, now Pat. No. 10,528,161.

(30) Foreign Application Priority Data

Dec. 25, 2017    (CN) .......................... 2017 1 1425291

(51) Int. Cl.
| | |
|---|---|
| *H01L 21/332* | (2006.01) |
| *C23F 1/02* | (2006.01) |
| *G06F 3/041* | (2006.01) |
| *G06F 3/044* | (2006.01) |

(52) U.S. Cl.
CPC ............ *G06F 3/041* (2013.01); *G06F 3/0443* (2019.05); *G06F 3/0446* (2019.05); *G06F 3/0412* (2013.01); *G06F 2203/04102* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS

| | | | |
|---|---|---|---|
| 4,269,935 A * | 5/1981 | Masters | ................... G03F 1/50 216/41 |
| 9,323,094 B2 | 4/2016 | Oem | |
| 9,477,358 B2 * | 10/2016 | Lee | ......................... G06F 3/044 |
| 2011/0267308 A1 | 11/2011 | Park | |
| 2013/0135224 A1 | 5/2013 | Lee | |

(Continued)

*Primary Examiner* — Shamim Ahmed
(74) *Attorney, Agent, or Firm* — Winston Hsu

(57) ABSTRACT

A manufacturing method of a touch panel includes following steps. The first sensing electrodes and the second sensing electrodes are formed on a substrate first. Connecting bridges are formed next, wherein adjacent two first sensing electrodes are connected by at least one connecting bridge, and a manufacturing method of the connecting bridges includes following steps. A metal layer is formed on the substrate first, wherein a material of the metal layer includes silver. A photoresist layer is formed on a surface of the metal layer next, wherein a material of the photoresist layer includes sulfur. A photolithography process and an etching process are respectively performed on the photoresist layer and the metal layer to form the connecting bridges, wherein silver in the metal layer and sulfur in the photoresist layer react with each other to form a silver sulfide layer after the photoresist layer is formed.

11 Claims, 24 Drawing Sheets

(56) References Cited

U.S. PATENT DOCUMENTS

| | | | | |
|---|---|---|---|---|
| 2014/0011013 A1* | 1/2014 | Jin | .................... | H01L 31/02366 428/297.4 |
| 2014/0125597 A1* | 5/2014 | Lee | ......................... | G06F 3/044 345/173 |
| 2016/0041644 A1* | 2/2016 | Bae | ....................... | G06F 3/0446 345/174 |

* cited by examiner

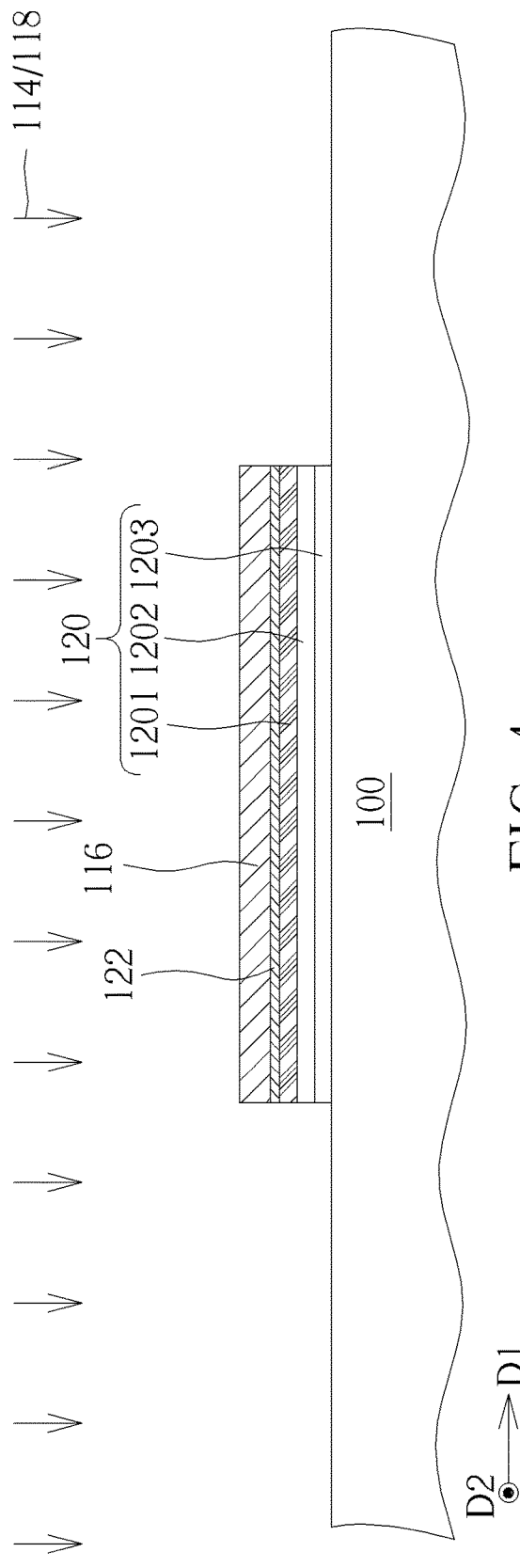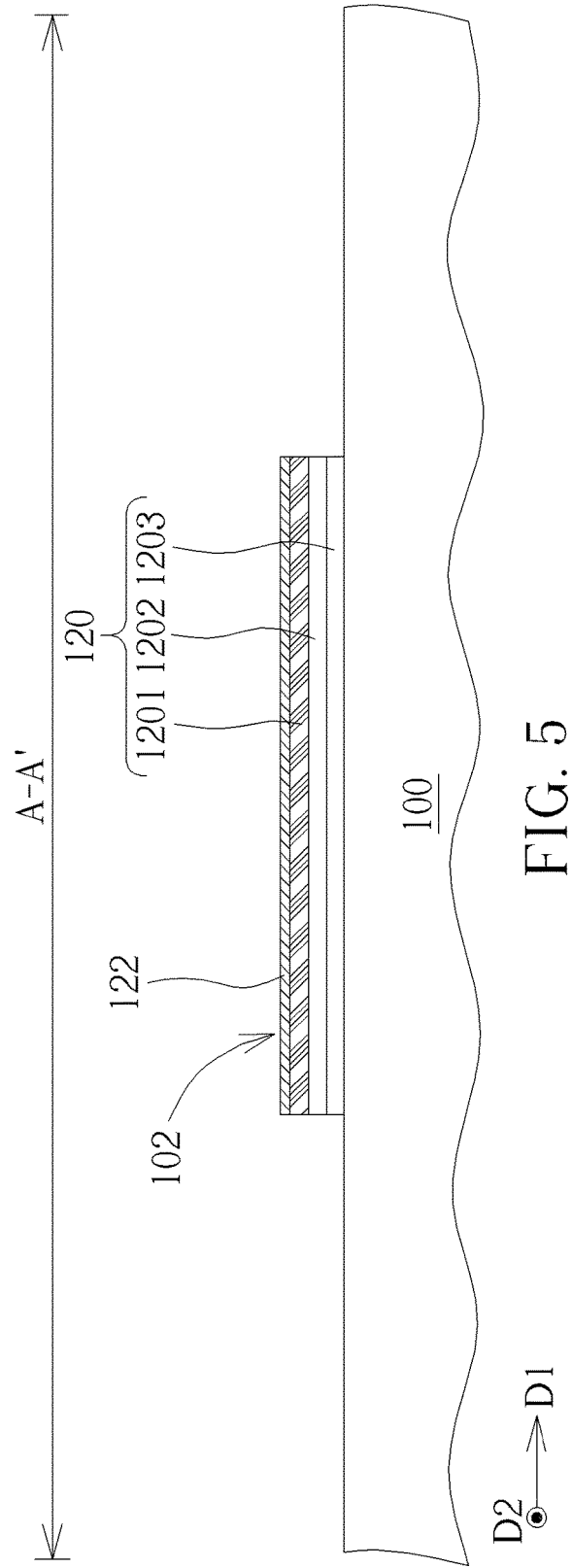

US 10,824,255 B2

MANUFACTURING METHOD OF TOUCH PANEL

CROSS REFERENCE TO RELATED APPLICATIONS

This patent application is a continuation application and claims priority of U.S. patent application Ser. No. 15/952,251, filed on Apr. 13, 2018, and the entire contents of which are incorporated herein by reference.

BACKGROUND OF THE INVENTION

1. Field of the Invention

The present invention relates to a touch panel, a touch display device, and a manufacturing method of a touch panel, and more particularly, to a touch panel, a touch display device, and a manufacturing method of a touch panel that can reduce the reflectivity of connecting bridges.

2. Description of the Prior Art

Touch panel has been widely used in all kinds of electronic products, wherein users can directly communicate with electronic products through the screen instead of traditional input devices such as keyboard and mouse, and therefore the volume of electronic product can be reduced and the convenience of communication between human and machine can be improved. In the conventional touch panel, sensing electrodes can be electrically connected by connecting bridges, and the connecting bridges can be formed of transparent conductive material (such as indium tin oxide (ITO)). In general, the transparent conductive material has lower reflectivity but higher resistance. Therefore, when the touch panel has larger scale, the connecting bridges are designed to be formed of metallic material for lowering the resistance of the connecting bridges. However, when the connecting bridges are formed of metallic material, the connecting bridges will have higher reflectivity due to the characteristic of metallic material and result in problems such as visual effect of touch panel.

SUMMARY OF THE INVENTION

The technical problem to be solved by this invention is that when the connecting bridges in the touch panel are formed of metallic material, the connecting bridges can have high reflectivity, which causes the problem of visual effect of the touch panel.

In order to solve the above problems, the present invention provides a manufacturing method of a touch panel. The manufacturing method includes following steps. A plurality of first sensing electrodes and a plurality of connecting bridges are formed on a substrate first, wherein adjacent two of the first sensing electrodes are connected by at least one of the connecting bridges, and a manufacturing method of the connecting bridges includes following steps. A metal layer is formed on the substrate first, wherein a material of the metal layer includes silver. A photoresist layer is formed on a surface of the metal layer next, wherein a material of the photoresist layer includes sulfur. Later, a photolithography process and an etching process are respectively performed on the photoresist layer and the metal layer, wherein silver in the metal layer and sulfur in the photoresist layer react with each other to form a silver sulfide layer after the photoresist layer is formed.

In order to solve the above problems, the present invention provides a touch panel. The touch panel includes a substrate, a plurality of first sensing electrodes and a plurality of connecting bridges. The first sensing electrodes and the connecting bridges are disposed on the substrate, wherein adjacent two of the first sensing electrodes are connected by at least one of the connecting bridges, and the connecting bridges includes a patterned metal layer and a patterned silver sulfide layer, wherein the patterned metal layer is disposed between the substrate and the patterned silver sulfide layer.

In order to solve the above problems, the present invention provides a touch display device. The touch display device includes a first substrate, a display medium layer, and a touch panel. The display medium layer is disposed on the first substrate, and the touch panel is disposed on the display medium layer. The touch panel includes a second substrate and a plurality of first sensing electrodes and a plurality of connecting bridges disposed on the second substrate, wherein adjacent two of the first sensing electrodes are connected by at least one of the connecting bridges, and the connecting bridges includes a patterned metal layer and a patterned silver sulfide layer, wherein the patterned metal layer is disposed between the second substrate and the patterned silver sulfide layer.

In order to solve the above problems, the present invention provides a manufacturing method of a touch panel. The manufacturing method includes following steps. First, a substrate is provided, and a plurality of sensing electrodes are formed on the substrate. The sensing electrodes include a plurality of first sensing electrodes. Next, a plurality of connecting bridges are formed on the substrate, and adjacent two of the first sensing electrodes are electrically connected through at least one of the connecting bridges. In addition, forming the connecting bridges includes following steps. First, a metal layer is formed on the substrate, and a material of the metal layer includes silver. Next, a photoresist layer is formed on a surface of the metal layer, and a material of the photoresist layer includes sulfur. Additionally, a patterned silver sulfide layer is formed, and the patterned silver sulfide layer includes silver sulfide formed by a reaction between the silver and the sulfur.

In the touch panel, the touch display device, and the manufacturing method of the touch panel of the present invention, the connecting bridges include the patterned silver sulfide layer disposed on the surface of the patterned metal layer. Since the color of silver sulfide is black and the reflectivity of silver sulfide is low, the problem of visual effect of the touch panel brought by the conventional metal connecting bridges and their high reflectivity can be solved. Further, the patterned metal layer included in each of the connecting bridges makes the connecting bridges have a lower resistance. Additionally, in the method of forming the connecting bridges in this invention, silver is used as one of the materials in the metal layer for forming the connecting bridges, wherein the layer which contains silver is the top one in the metal layer. The sulfur contained photoresist material is used in the following photolithography process, such that the silver sulfide layer can be formed between the photoresist layer and the metal layer due to the characteristic of strong reactivity between silver and sulfur. Accordingly, the method of forming the connecting bridges in this invention does not increase the difficulty or the amount of processes comparing to the conventional method.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 2-6 are schematic diagrams illustrating a method of forming the connecting bridges in the manufacturing method of the touch panel according to the first embodiment of the present invention.

DETAILED DESCRIPTION

Figure 1:
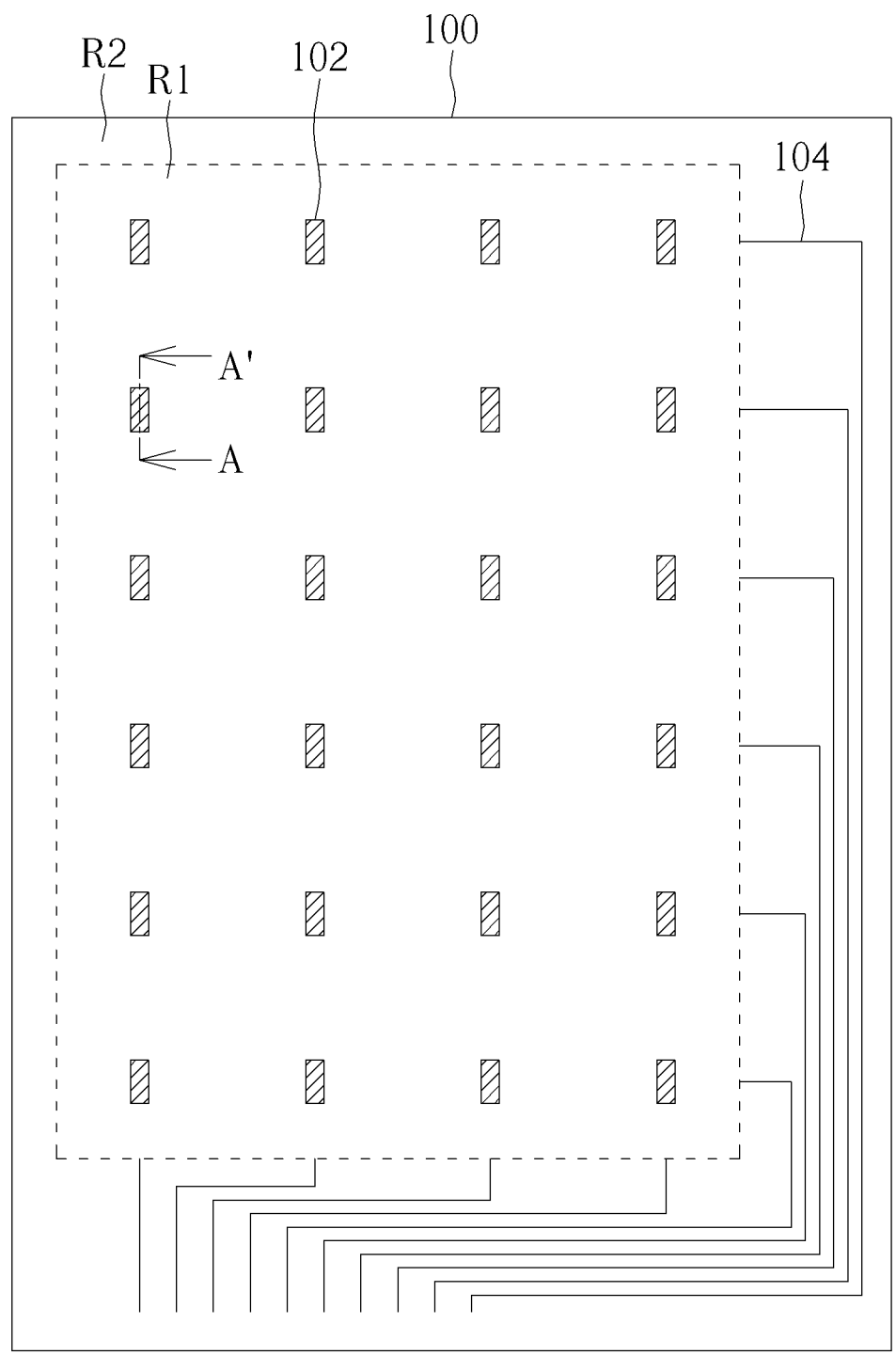
FIG. 1 is a schematic diagram illustrating a top view of forming connecting bridges and traces in a manufacturing method of a touch panel according to a first embodiment of the present invention.

To provide a better understanding of the present invention to those skilled in the technology, preferred embodiments will be detailed as follows. The preferred embodiments of the present invention are illustrated in the accompanying drawings with numbered elements to elaborate on the contents and effects to be achieved. It should be noted that the drawings are simplified schematics, and therefore show only the components and combinations associated with the present invention, so as to provide a clearer description of the basic architecture or method of implementation. The components would be complex in reality. In addition, for ease of explanation, the components shown in the drawings may not represent their actual number, shape, and dimensions; details can be adjusted according to design requirements.

Figure 2:
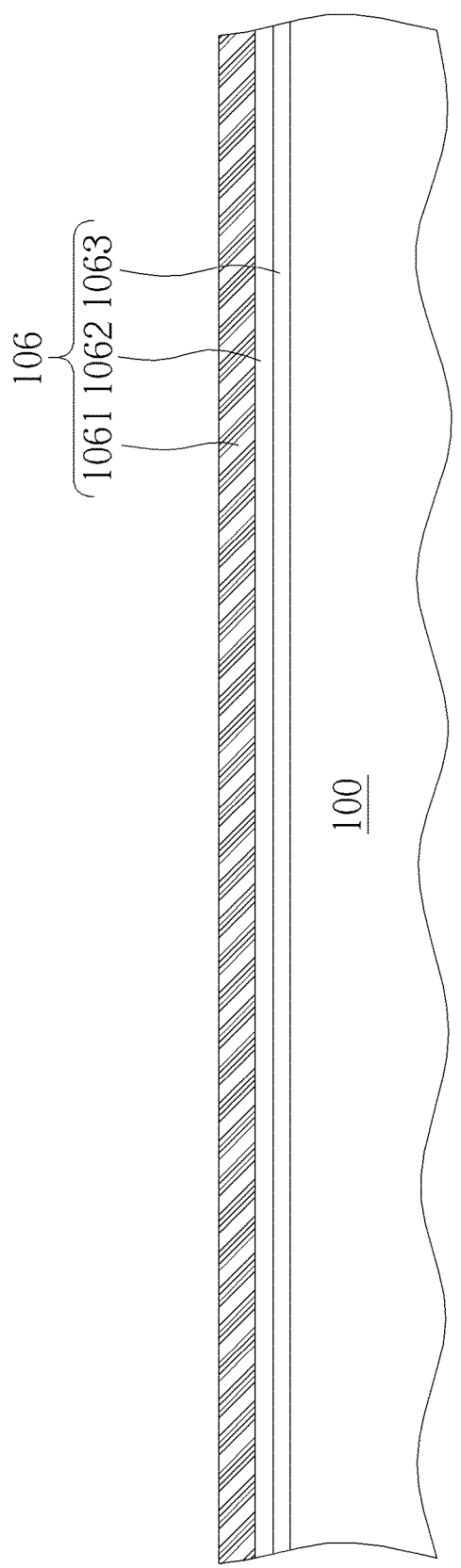
Figure 3:
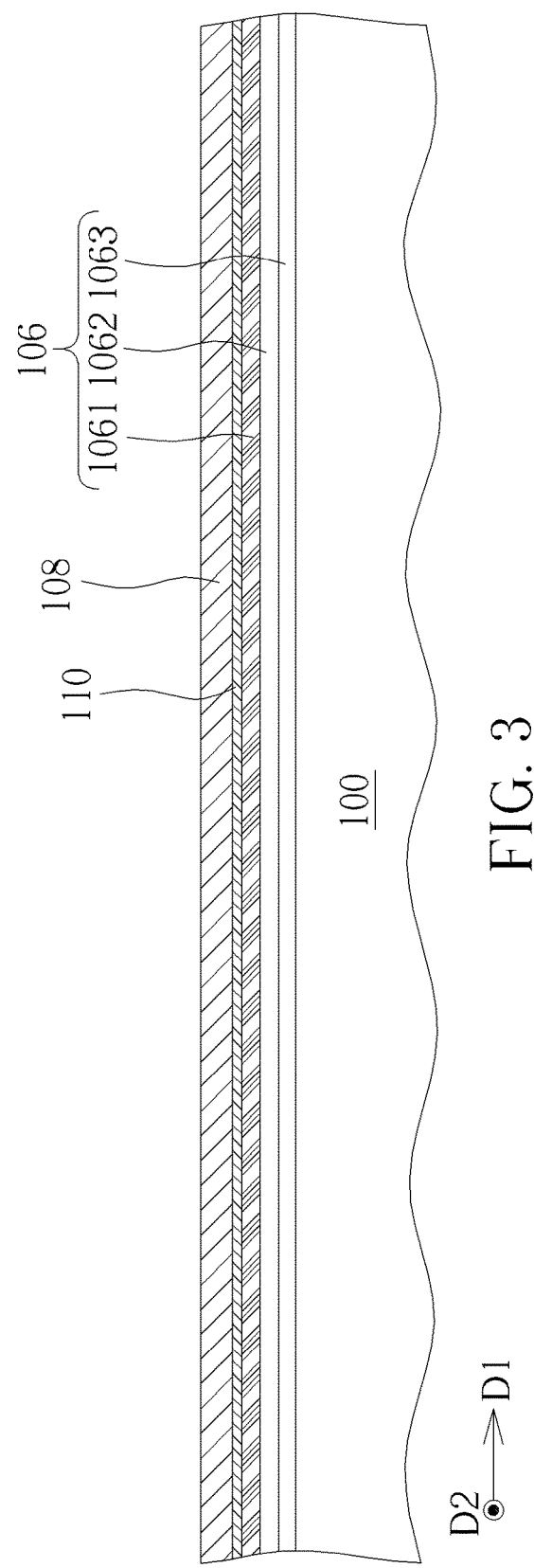
Figure 6:
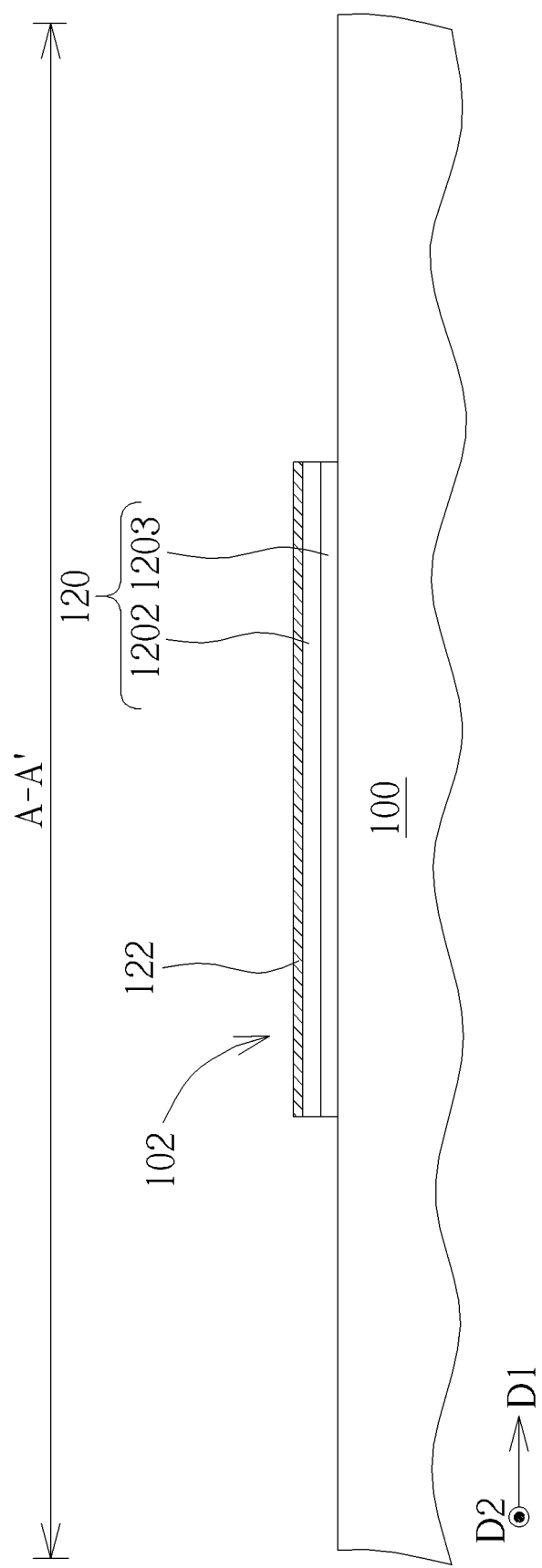
Figure 7:
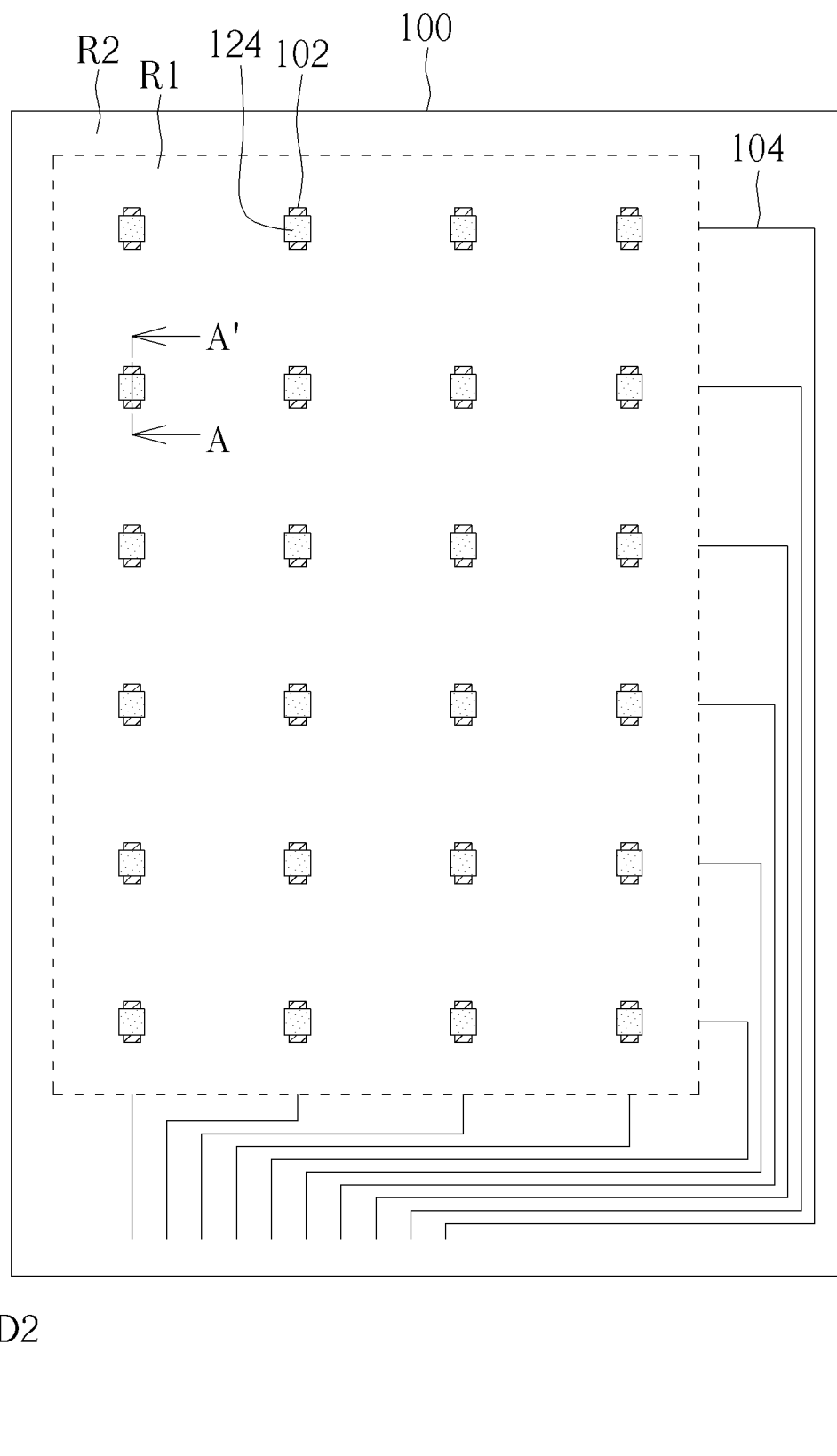
FIG. 7 is a schematic diagram illustrating a top view of forming insulating islands in the manufacturing method of the touch panel according to the first embodiment of the present invention.
Figure 8:
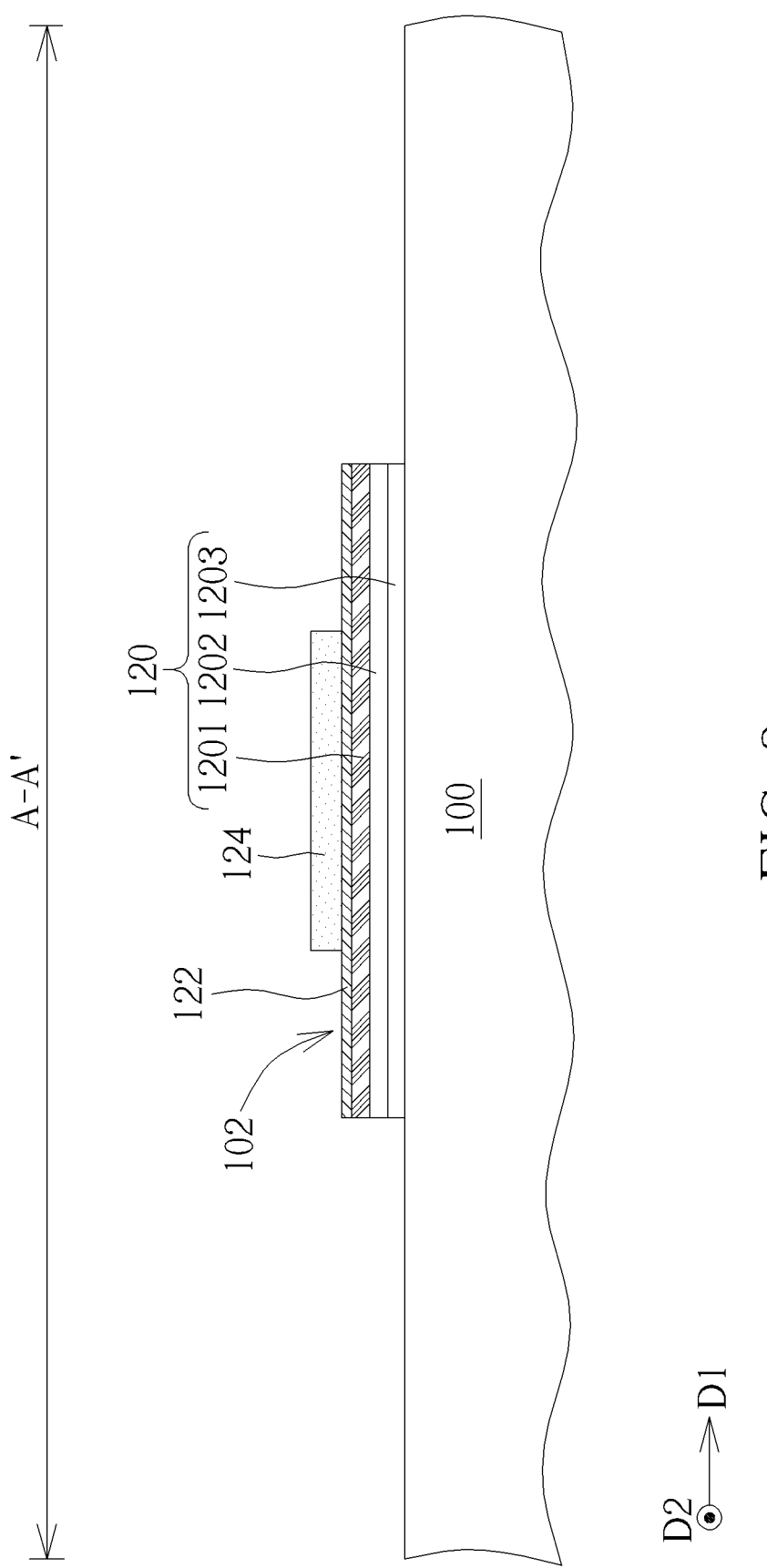
FIG. 8 is a schematic diagram illustrating a cross-sectional diagram taken along a line A-A' in FIG. 7.
Figure 9:
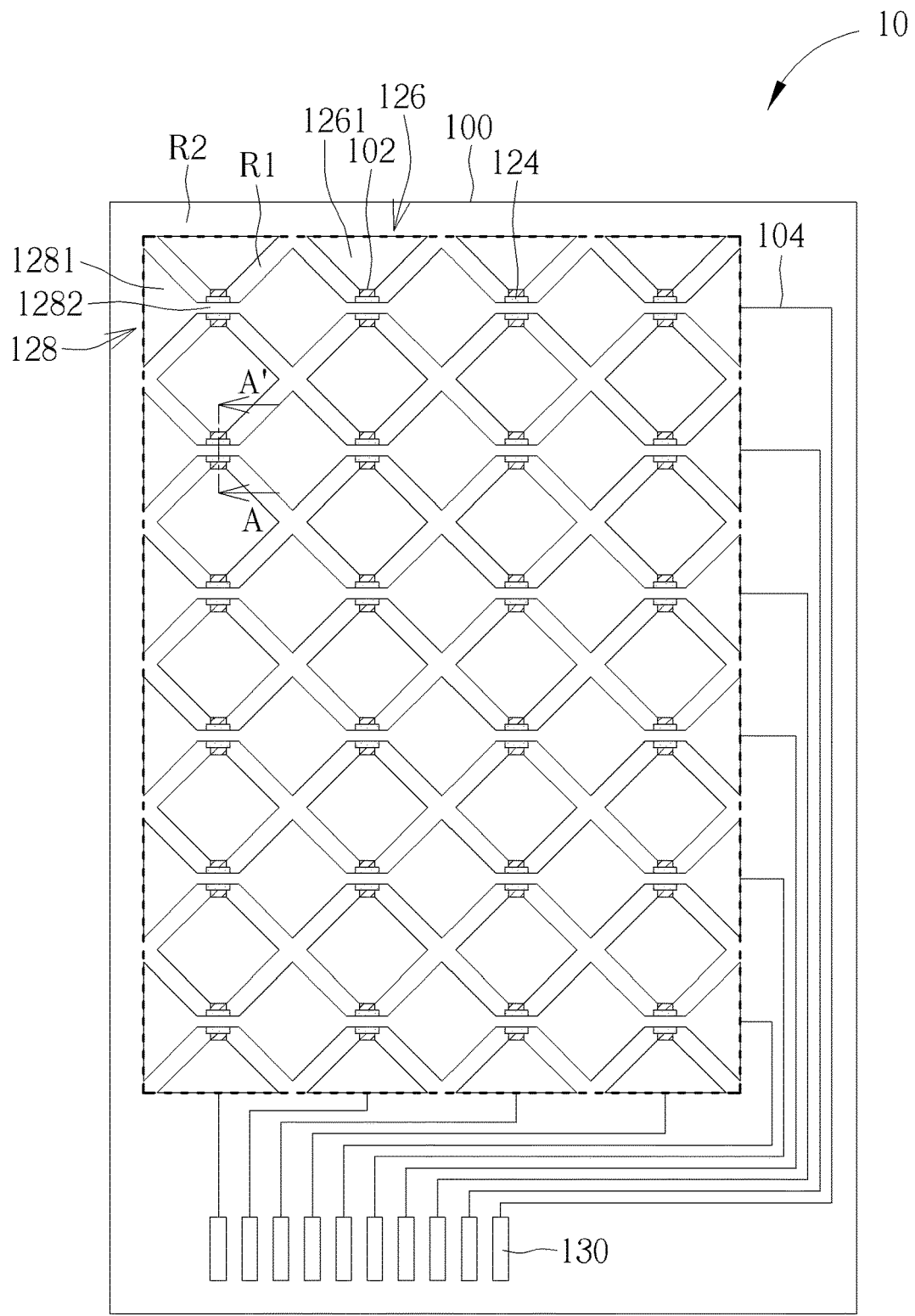
FIG. 9 is a schematic diagram illustrating a top view of forming the first sensing electrodes, the second sensing electrodes, and the connecting lines in the manufacturing method of the touch panel according to the first embodiment of the present invention.
Figure 10:
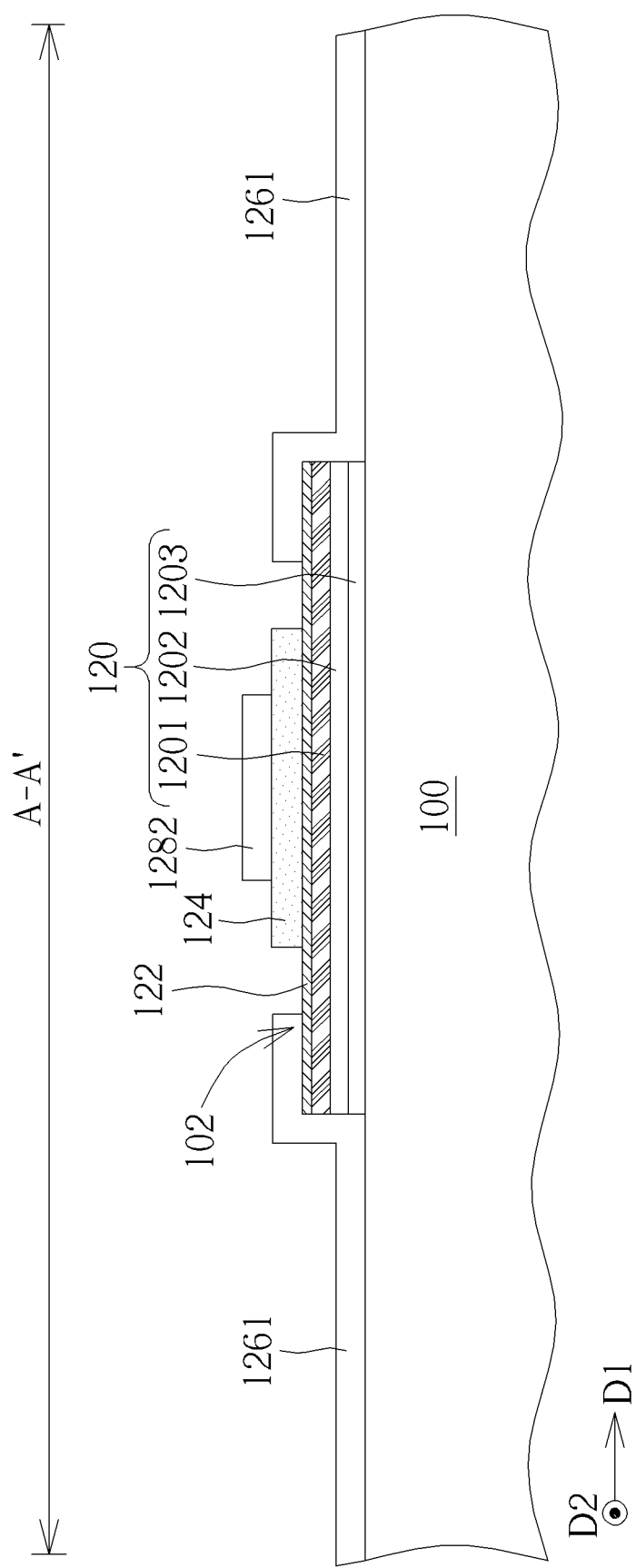
FIG. 10 is a schematic diagram illustrating a cross-sectional diagram taken along a line A-A' in FIG. 9.
Figure 11:
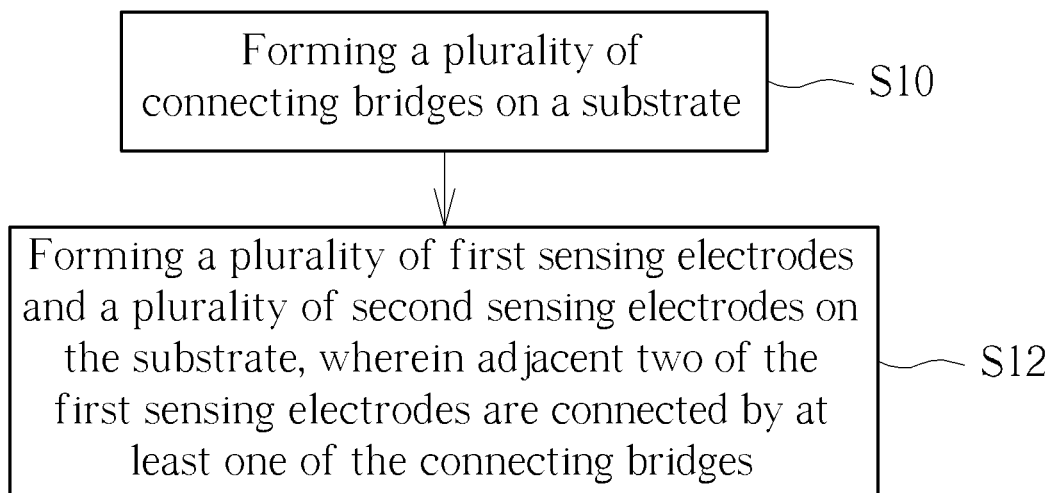
FIG. 11 is a schematic diagram illustrating a process flow of the manufacturing method of the touch panel according to the present invention.
Figure 12:
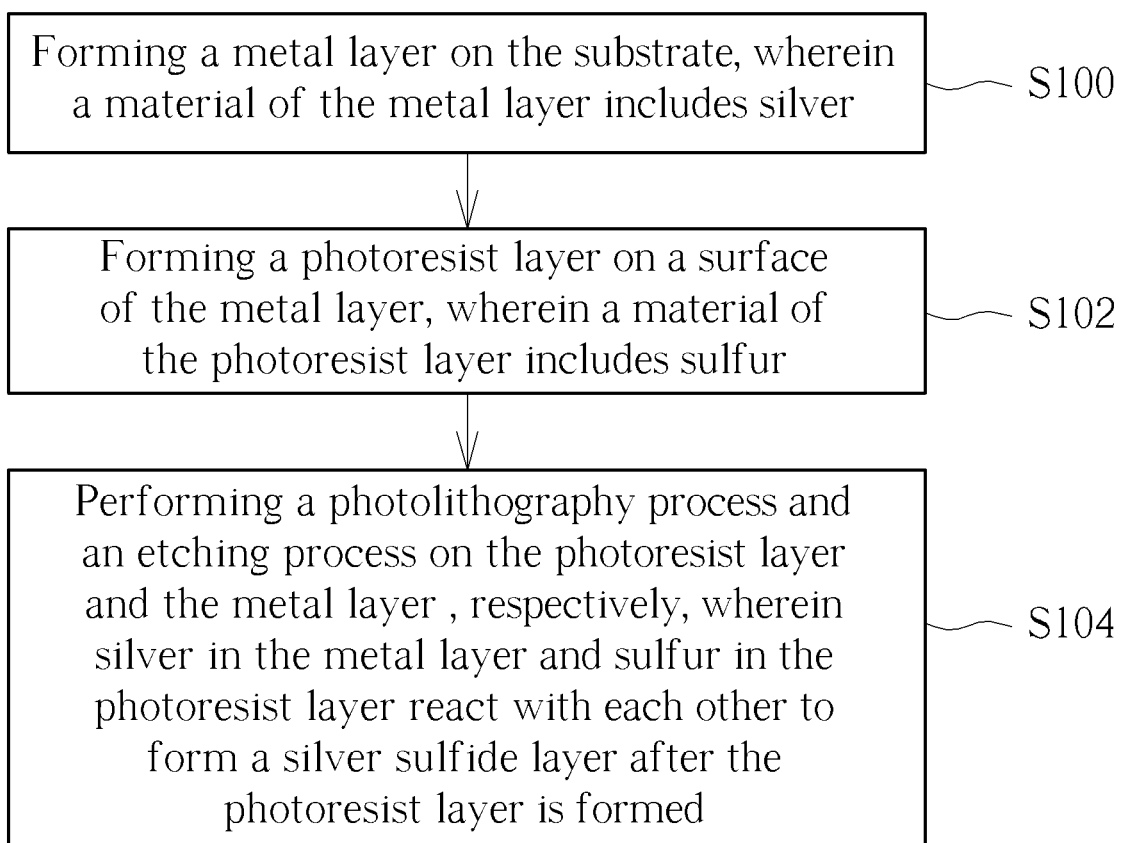
FIG. 12 is a schematic diagram illustrating a process flow of the method of forming the connecting bridges according to the present invention.

Referring to FIG. 1 to FIG. 12, FIG. 1 is a schematic diagram illustrating a top view of forming connecting bridges and traces in a manufacturing method of a touch panel according to a first embodiment of the present invention, FIGS. 2-6 are schematic diagrams illustrating a method of forming the connecting bridges in the manufacturing method of the touch panel according to the first embodiment of the present invention, FIG. 7 is a schematic diagram illustrating a top view of forming insulating islands in the manufacturing method of the touch panel according to the first embodiment of the present invention, FIG. 9 is a schematic diagram illustrating a top view of forming the first sensing electrodes, the second sensing electrodes, and the connecting lines in the manufacturing method of the touch panel according to the first embodiment of the present invention, FIG. 8 and FIG. 10 are schematic diagrams illustrating cross-sectional diagrams taken along lines A-A' in FIG. 7 and FIG. 9, FIG. 11 is a schematic diagram illustrating a process flow of the manufacturing method of the touch panel according to the present invention, and FIG. 12 is a schematic diagram illustrating a process flow of the method of forming the connecting bridges according to the present invention. A manufacturing method of a touch panel of this embodiment includes following steps. First, as shown in FIG. 1, a plurality of connecting bridges 102 and a plurality of traces 104 are formed on a substrate 100. An active region R1 and a peripheral region R2 are defined on the substrate 100, the peripheral region R2 locates at at least one side of the active region R1, and the peripheral region R2 of this embodiment surrounds the active region R1, but not limited thereto. The connecting bridges 102 and the traces 104 are disposed on a surface of the substrate 100, wherein the connecting bridges 102 are disposed in the active region R1, and the traces 104 are disposed in the peripheral region R2. The substrate 100 may be a rigid substrate such as a glass substrate, a plastic substrate, a quartz substrate, or a sapphire substrate, and the substrate 100 may also be a flexible substrate that includes polyimide (PI) or polyethylene terephthalate (PET), but not limited thereto. The method of forming the connecting bridges 102 of this embodiment is described in detail hereinafter. First, as shown in FIG. 2, a metal layer 106 is formed on the substrate 100 entirely, wherein the material of the metal layer 106 includes silver. For example, the metal layer 106 of this embodiment includes a stacking layer structure, and the stacking layer structure includes three metallic material layers such as a silver layer 1061, an aluminum layer 1062, and a molybdenum layer 1063. The silver layer 1061 is the top one of the metallic material layers of the stacking layer structure, the molybdenum layer 1063 is the bottom one of the metallic material layers of the stacking layer structure, and the aluminum layer 1062 is disposed between the silver layer 1061 and the molybdenum layer 1063. The method of forming the stacking layer structure of the metal layer 106 can be sequentially forming the molybdenum layer 1063, the aluminum layer 1062, and the silver layer 1061 from the bottom to the top for instance. The silver layer 1061, the aluminum layer 1062, and the molybdenum layer 1063 can be deposited by the sputtering process for instance, but not limited thereto. For example, the thickness of the silver layer 1061 is about 75 angstroms to about 1000 angstroms, the thickness of the aluminum layer 1062 is about 1000 angstroms to about 4000 angstroms, and the thickness of the molybdenum layer 1063 is about 100 angstroms to about 1000 angstroms in this embodiment, but not limited thereto. Next, as shown in FIG. 3, a photoresist layer 108 is formed on a surface of the metal layer 106. In this embodiment, the photoresist layer 108 is formed on a surface of the silver layer 1061 and directly contacts the silver layer 1061. The photoresist layer 108 is formed of the photosensitive material that includes sulfur. In this embodiment, the photoresist layer 108 is a positive photoresist layer, wherein the material of the positive photoresist layer normally includes sulfur, but not limited thereto. In some embodiments, the photoresist layer 108 may be the negative photoresist layer that includes sulfur. After the photoresist layer 108 is formed, since the surface of the photoresist layer 108 directly contacts the surface of the metal layer 106, and since there is a strong reactivity between silver and sulfur, a portion of the silver layer 1061 can react with sulfur in the photoresist layer 108 to form a silver sulfide layer 110, and the silver sulfide layer 110 is located between the silver layer 1061 and the photoresist layer 108. The chemical equation of the aforementioned reaction is $2Ag+S \rightarrow Ag_2S$. Additionally, the color of the silver sulfide layer 110 is black and thus the silver sulfide layer 110 has a relatively low reflectivity to the light. In this embodiment, the photoresist layer 108 can be formed by a spin coating process for example, but not limited thereto.

Next, as shown in FIG. 4, a photolithography process 114 is performed on the photoresist layer 108 to form a patterned photoresist layer 116 based on the photosensitive characteristic of the photoresist layer 108, and the patterned photoresist layer 116 is used as a mask in an etching process 118 performed later. The etching process 118 of this embodiment is performed on the silver sulfide layer 110, the silver layer 1061, the aluminum layer 1062, and the molybdenum layer 1063. A portion of the silver sulfide layer 110 and a portion of the metal layer 106 that are not covered by the patterned photoresist layer 116 are removed by the etching process 118 to form a patterned silver sulfide layer 122, a patterned silver layer 1201, a patterned aluminum layer 1202, and a patterned molybdenum layer 1203. The patterned silver layer 1201, the patterned aluminum layer 1202, and the patterned molybdenum layer 1203 form a patterned metal layer 120 including a patterned stacking layer structure, wherein the patterned silver layer 1201, the patterned aluminum layer 1202, and the patterned molybdenum layer 1203 can be regarded as three different patterned metallic material layers. In addition, a baking process (e.g., pre-baking process) is performed on the photoresist layer 108 after forming the photoresist layer 108 on the surface of the metal layer 106 and before performing the photolithography process 114 on the photoresist layer 108 to form the patterned photoresist layer 116, so as to evaporate the solvent in the photoresist layer 108. The baking temperature of the pre-baking process is about 80° C. to 160° C., and the duration can be 1 minute to 5 minutes, but not limited thereto. In addition, another baking process (e.g., hard baking process) is performed on the photoresist layer 108 after forming the patterned photoresist layer 116 and before removing the portion of the silver sulfide layer 110 and the portion of the metal layer 106 that are not covered by the patterned photoresist layer 116, so as to harden the patterned photoresist layer 116. The baking temperature of the hard baking process is about 80° C. to 160° C., and the duration can be 1 minute to 10 minutes, but not limited thereto. For example, the baking temperature and the duration of the pre-baking process may be 120° C. and 140 seconds respectively, and the baking temperature and the duration of the hard baking process may be 110° C. and 5 minutes respectively, but not limited thereto. The reaction between sulfur in the photoresist layer 108 and/or the patterned photoresist layer 116 and the silver layer 1061 can be speeded up by the aforementioned baking processes, and the silver sulfide layer 110 can be uniformly formed between the silver layer 1061 and the photoresist layer 108 due to the aforementioned baking processes. In other embodiments, only one of the aforementioned baking processes can be performed, or at least one baking process in addition to the aforementioned baking processes can further be performed. Next, as shown in FIG. 5, the patterned photoresist layer 116 is removed from the substrate 100 to expose the patterned silver sulfide layer 122, wherein FIG. 5 is a cross-sectional diagram taken along the line A-A' in FIG. 1. Accordingly, the connecting bridges 102 formed of the patterned metal layer 120 and the patterned silver sulfide layer 122 in this embodiment can be formed by the method described above. Note that in this embodiment, sulfur in the patterned photoresist layer 116 may or may not diffuse through the silver sulfide layer 110 to continuously react with silver in the sliver layer 1061 and/or diffuse through the patterned silver sulfide layer 122 to continuously react with silver in the patterned sliver layer 1201 to form silver sulfide after the patterned photoresist layer 116 is formed and before the patterned photoresist layer 116 is removed from the substrate 100. In addition, in FIG. 2 to FIG. 5, the silver sulfide layer 110 is formed after the photoresist layer 108 is formed and before the patterned photoresist layer 116 is formed, and the silver sulfide layer 110 that is not covered by the patterned photoresist layer 116 is etched in the etching process 118 to form the patterned silver sulfide layer 122, but not limited thereto. In a variant embodiment, the silver sulfide layer 110 is not formed after the photoresist layer 108 is formed and before the patterned photoresist layer 116 is formed (i.e. the silver layer 1061 does not react with sulfur in the photoresist layer 108 to form the silver sulfide layer 110 after the photoresist layer 108 is formed and before the patterned photoresist layer 116 is formed, this may be because the contact time between the silver layer 1061 and the photoresist layer 108 is short and/or the temperature is not high enough to make the silver layer 1061 react with sulfur in the photoresist layer 108), and sulfur in the patterned photoresist layer 116 reacts with the silver layer 1061 and/or the patterned silver layer 1201 to form the patterned silver sulfide layer 122 after the patterned photoresist layer 116 is formed and before the patterned photoresist layer 116 is removed from the substrate 100 (i.e. the baking process performed on the patterned photoresist layer 116 makes the silver layer 1061 react with sulfur in the patterned photoresist layer 116 to form the patterned silver sulfide layer 122). Because the patterned silver sulfide layer 122 is formed after the patterned photoresist layer 116 is formed, the etching process 118 is performed on the silver layer 1061, the aluminum layer 1062, and the molybdenum layer 1063 to form a patterned silver layer 1201, a patterned aluminum layer 1202, and a patterned molybdenum layer 1203 in this variant embodiment. To sum up, a manufacturing method of the connecting bridges in the present invention comprises forming a metal layer comprising silver on a substrate; forming a photoresist layer comprising sulfur on a surface of the metal layer; performing a photolithography process and an etching process on the photoresist layer and the metal layer, respectively; and removing the photoresist from the substrate; wherein silver in the metal layer (non-patterned and/or patterned metal layer) and sulfur in the photoresist layer (non-patterned and/or patterned photoresist layer)

react with each other to form a silver sulfide layer after the photoresist layer is formed on the surface of the metal layer and before the photoresist layer is removed from the substrate. In addition, as shown in FIG. 1, the traces 104 in the peripheral region R2 may include the same structure and material as the connecting bridges 102 in the active region R1, and the traces 104 and the connecting bridges 102 may be formed together in this embodiment for example, but not limited thereto. In other embodiments, the traces 104 in the peripheral region R2 and the connecting bridges 102 in the active region R1 may be formed separately and include different structures and materials. In addition, as shown in FIG. 6, the thickness of the silver layer 1061 is thinner and/or the reaction time of the silver layer 1061 and the photoresist layer 108 is longer in some embodiments, such that the entire silver layer 1061 can be reacted with sulfur in the photoresist layer 108, and the silver sulfide layer 110 formed by the reaction can replace the silver layer 1061 completely. Under the circumstances, the connecting bridges 102 formed afterwards can only include the patterned silver sulfide layer 122, the patterned aluminum layer 1202, and the patterned molybdenum layer 1203.

Next, as shown in FIG. 7 and FIG. 8, a plurality of insulating islands 124 are formed in the active region R1 of the substrate 100, wherein each of the insulating islands 124 is disposed corresponding to one of the connecting bridges 102. Each of the insulating islands 124 partially covers the corresponding connecting bridge 102, and two ends of the corresponding connecting bridge 102 are exposed. For example, the method of forming the insulating islands 124 in this embodiment includes forming an insulating layer on the substrate 100 first, and performing a patterning process on the insulating layer to form the insulating islands 124 next, but not limited thereto. The insulating islands 124 include insulating material such as silicon oxide, silicon nitride, or silicon oxynitride, but not limited thereto. Next, a transparent conductive layer is formed on the substrate 100, in which the material of the transparent conductive layer can include transparent conductive material such as indium tin oxide (ITO), indium zinc oxide (IZO), or aluminum zinc oxide (AZO), but not limited thereto. Next, as shown in FIG. 9 and FIG. 10, a patterning process is performed on the transparent conductive layer to form a patterned transparent conductive layer that includes a plurality of first sensing electrodes 1261, a plurality of second sensing electrodes 1281, and a plurality of connecting lines 1282. In short, the first sensing electrodes 1261, the second sensing electrodes 1281, and the connecting lines 1282 in this embodiment are formed of the same material which is the transparent conductive material, but not limited thereto. The first sensing electrodes 1261, the second sensing electrodes 1281, and the connecting lines 1282 are disposed in the active region R1. In addition, each of the first sensing electrodes 1261 partially covers and contacts one end of the corresponding connecting bridge 102. Therefore, two adjacent first sensing electrodes 1261 are electrically connected through one of the connecting bridges 102, and the first sensing electrodes 1261 and the connecting bridges 102 form a plurality of first sensing electrode series 126, wherein each of the first sensing electrode series 126 extends in a first direction D1. In this embodiment, two adjacent first sensing electrodes 1261 are electrically connected by one connecting bridge 102, but not limited thereto. In other embodiments, each of the insulating islands 124 is disposed corresponding to two or more of the connecting bridges 102 and partially covers the corresponding connecting bridges 102, and two adjacent first sensing electrodes 1261 are electrically connected by multiple connecting bridges 102 in order to reduce the resistance of the first sensing electrode series 126 and prevent the electrical disconnection between two adjacent first sensing electrodes 1261 during the manufacturing processes or when the touch panel is bent. To sum up, each of the insulating islands 124 is disposed corresponding to at least one of the connecting bridges 102 and partially covers the at least one corresponding connecting bridge 102, and two adjacent first sensing electrodes 1261 are electrically connected through at least one of the connecting bridges 102 in the present invention. For example, two adjacent first sensing electrodes 1261 can be connected by two connecting bridges 102. Under the circumstances, if one of the connecting bridges 102 is broken during the manufacturing processes of the connecting bridges 102, or if one of the connecting bridges 102 is broken by the stress when the touch panel is a flexible touch panel and the touch panel is bent, the adjacent two first sensing electrodes 1261 still can be electrically connected by another connecting bridge 102. Therefore, the yield and the reliability of the touch panel can be improved. In addition, when two adjacent first sensing electrodes 1261 are electrically connected by multiple connecting bridges 102, the two adjacent first sensing electrodes 1261 can be regarded as being electrically connected by multiple connecting bridges that are electrically connected in parallel with each other, the resistance of the first sensing electrode series 126 can therefore be reduced, and the accuracy of touch sensing can also be improved. In this embodiment, the extension direction of the connecting bridges 102 is parallel to the first direction D1, but not limited thereto. For example, the touch panel may be a flexible touch panel, wherein a bending axis of the touch panel is parallel to a second direction D2, and the second direction is D2 is perpendicular to the first direction D1. Under the circumstances, if the extension direction of the connecting bridges 102 is parallel to the first direction D1, the connecting bridges 102 may suffer a relatively large stress that may make the connecting bridges 102 break when the touch panel is bent according to the bending axis. Therefore, the extension direction of the connecting bridges 102 and the first direction D1 can be designed to have an included angle that is greater than 0 degree and less than 90 degrees, so as to reduce the stress introduced to the connecting bridges 102 when the touch panel is bent according to the bending axis and improve the reliability of the touch panel. In addition, two adjacent second sensing electrodes 1281 are connected by one of the connecting lines 1282, and the second sensing electrodes 1281 and the connecting lines 1282 can form a plurality of second sensing electrode series 128, wherein each of the second sensing electrode series 128 extends in the second direction D2. The first direction D1 and the second direction D2 are not parallel, and the first direction D1 is perpendicular to the second direction D2 in this embodiment, but not limited thereto. In this embodiment, two adjacent second sensing electrodes 1281 are connected by one of the connecting lines 1282, and the extension direction of the connecting lines 1282 is parallel to the second direction D2, but not limited thereto. In other embodiments, the two adjacent second sensing electrodes 1281 can be connected by multiple connecting lines 1282, and such configuration can be similar to the above description of the first sensing electrodes 1261 and the connecting bridges 102. In still another embodiment, the extension direction of the connecting lines 1282 and the second direction D2 can have an included angle that is greater than 0 degree and less than 90 degrees. In addition, each of the connecting lines 1282 partially covers the corresponding insulating island 124, and the insulating islands 124 are disposed between the connecting bridges 102 and the connecting lines 1282. Therefore, the insulating islands 124 can electrically isolate the connecting bridges 102 from the connecting lines 1282, so as to electrically isolate the first sensing electrode series 126 from the second sensing electrode series 128.

In addition, the patterned transparent conductive layer of this embodiment further includes a plurality of bonding pads 130 disposed in the peripheral region R2, wherein each of the bonding pads 130 is connected to one of the traces 104, and each of the bonding pads 130 is disposed at one end of the corresponding trace 104, but not limited thereto. In some embodiments, the bonding pads 130 and the connecting bridges 102 are formed simultaneously and have the same structure and material, but not limited thereto. In other embodiments, the bonding pads 130 can include the double layer stacking layer structure, wherein one layer in the double layer stacking layer structure can be formed simultaneously with the connecting bridges 102 and can have the same structure and material as the connecting bridges 102, and another layer in the double layer stacking layer structure can be formed simultaneously with the patterned transparent conductive layer and can have the same structure and material as the patterned transparent conductive layer. In addition, another end of each of the traces 104 is connected to one of the first sensing electrodes 1261 of one of the first sensing electrode series 126 or one of the second sensing electrodes 1281 of one of the second sensing electrode series 128. Therefore, the first sensing electrode series 126 and the second sensing electrode series 128 can be connected to an integrated circuit (IC) (not shown in the figure) through the bonding pads 130, but not limited thereto. The sensing type of the touch panel in this embodiment is the mutual-capacitive touch sensing, but not limited thereto. Each first sensing electrode 1261 can be the transmitter electrode, each second sensing electrode 1281 can be the receiver electrode, and vice versa. In other embodiments, the sensing type of the touch panel can be the self-capacitive touch sensing. The touch panel 10 shown in FIG. 9 can be manufactured according to the manufacturing method of this embodiment described above. However, the touch panel 10 of this invention is not limited to the above description, other devices and the corresponding manufacturing methods in the conventional touch panel can also be integrated into the touch panel 10 and the corresponding manufacturing method of this embodiment. To sum up, the manufacturing method of the touch panel 10 of this embodiment mainly includes step S10 to step S12 shown in FIG. 11, and the sequence of performing step S10 to step S12 is not limited to the following order.

Step S10: Forming a plurality of connecting bridges on a substrate; and

S12: Forming a plurality of first sensing electrodes and a plurality of second sensing electrodes on the substrate, wherein adjacent two of the first sensing electrodes are connected by at least one of the connecting bridges.

Further, the method of forming the connecting bridges 102 of this embodiment can include step S100 to step S104 shown in FIG. 12, and the sequence of performing step S100 to step S104 is not limited to the following order.

S100: Forming a metal layer on the substrate, wherein a material of the metal layer includes silver;

S102: Forming a photoresist layer on a surface of the metal layer, wherein a material of the photoresist layer includes sulfur; and S104: Performing a photolithography process and an etching process on the photoresist layer and the metal layer, respectively, wherein silver in the metal layer and sulfur in the photoresist layer react with each other to form a silver sulfide layer after the photoresist layer is formed.

Accordingly, the touch panel 10 (as shown in FIG. 9 and FIG. 10) of this embodiment can be manufactured by the above method. The touch panel 10 includes the substrate 100, the first sensing electrodes 1261, and the connecting bridges 102. The first sensing electrodes 1261 and the connecting bridges 102 are disposed on the substrate 100, wherein two adjacent first sensing electrodes 1261 are connected by at least one of the connecting bridges 102. The connecting bridges 102 include the patterned metal layer 120 and the patterned silver sulfide layer 122, wherein the patterned metal layer 120 is disposed between the substrate 100 and the patterned silver sulfide layer 122. According to the touch panel 10 of this embodiment and the manufacturing method thereof, the silver layer 1061 is the top one of the metallic material layers of the stacking layer structure of the metal layer 106 as shown in FIG. 2, and sulfur contained photoresist layer 108 is formed on the surface of the silver layer 1061 and contacts the silver layer 1061, such that the silver layer 1061 can react with sulfur in the photoresist layer 108 to form the silver sulfide layer 110, and the connecting bridges 102 formed afterwards can include the patterned metal layer 120 and the patterned silver sulfide layer 122 covering the patterned metal layer 120. Since the color of silver sulfide is black, silver sulfide can therefore have a lower reflectivity, and the problem of visual effect of the touch panel brought by the conventional metal connecting bridges can be solved by the design of this invention. Further, the patterned metal layer 120 included in each of the connecting bridges 102 makes the connecting bridges 102 have a lower resistance. Additionally, the method of forming the connecting bridges 102 in this embodiment does not increase the difficulty or the amount of processes comparing to the conventional method.

The touch panel and the manufacturing method thereof of the present invention are not limited to the aforementioned embodiment. The following description continues to detail other embodiments or variant embodiments. To simplify the description and show the difference between other embodiments, variant embodiments and the above-mentioned embodiment, identical components in each of the following embodiments are marked with identical symbols, and the identical features will not be redundantly described.

Figure 13:
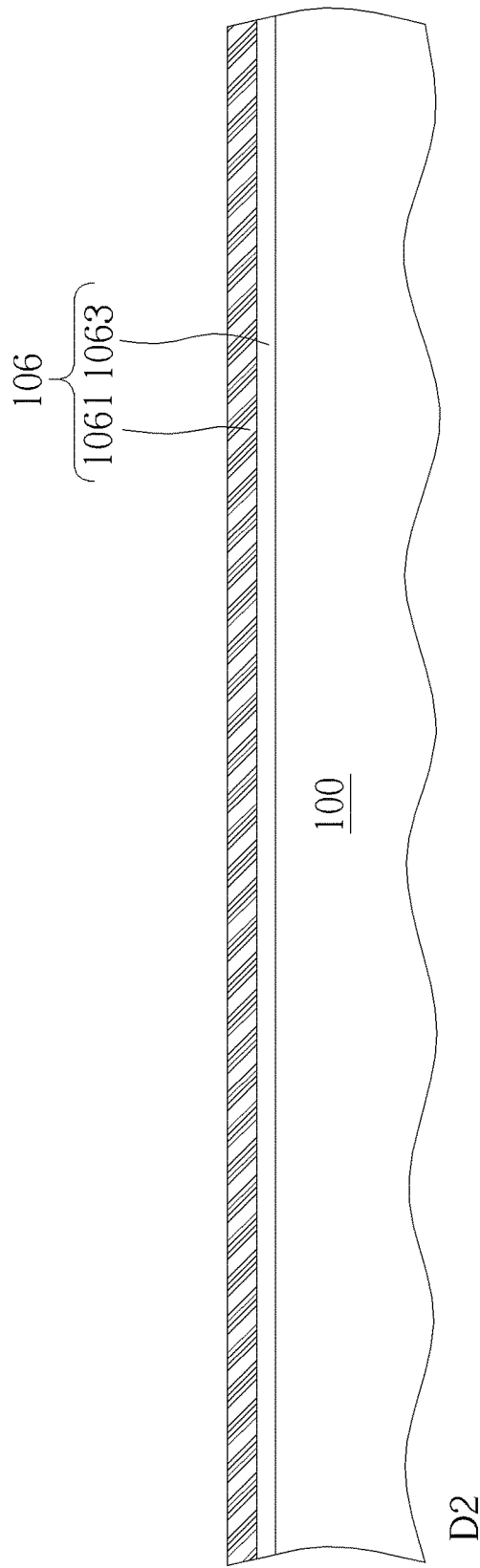
FIGS. 13-15 are schematic diagrams illustrating a method of forming the connecting bridges according to a first variant embodiment of the first embodiment of the present invention.
Figure 14:
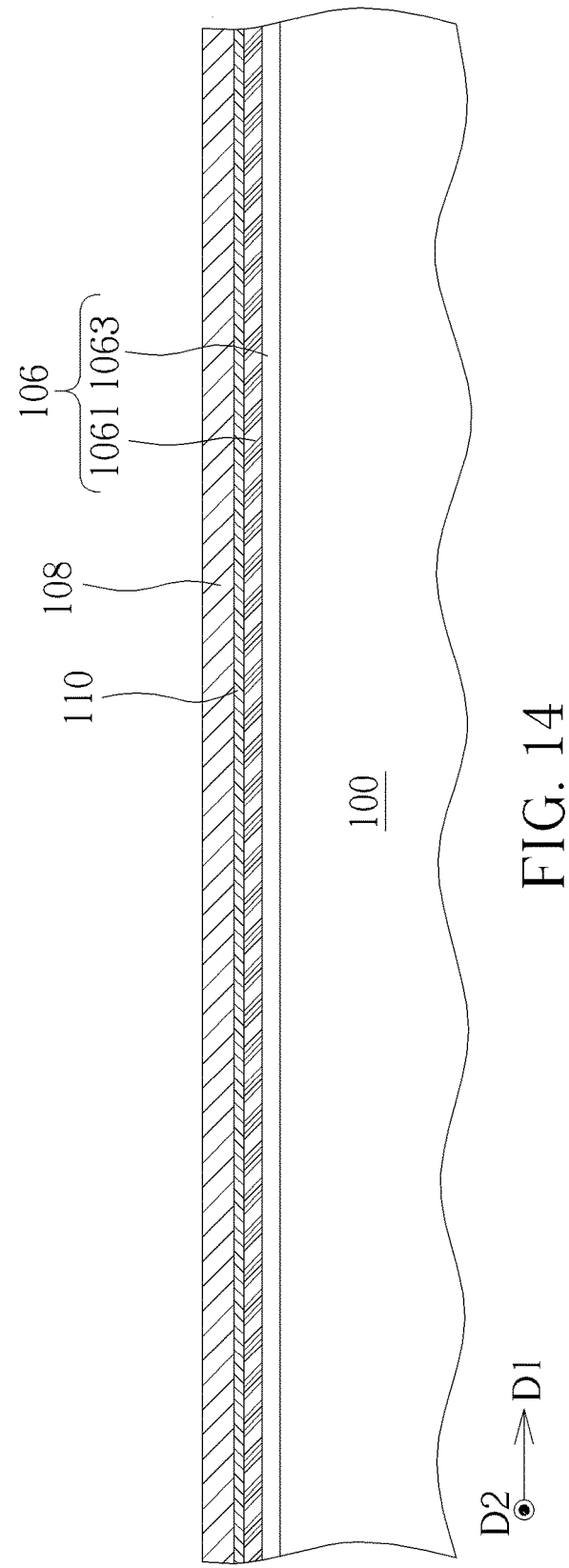
Figure 15:
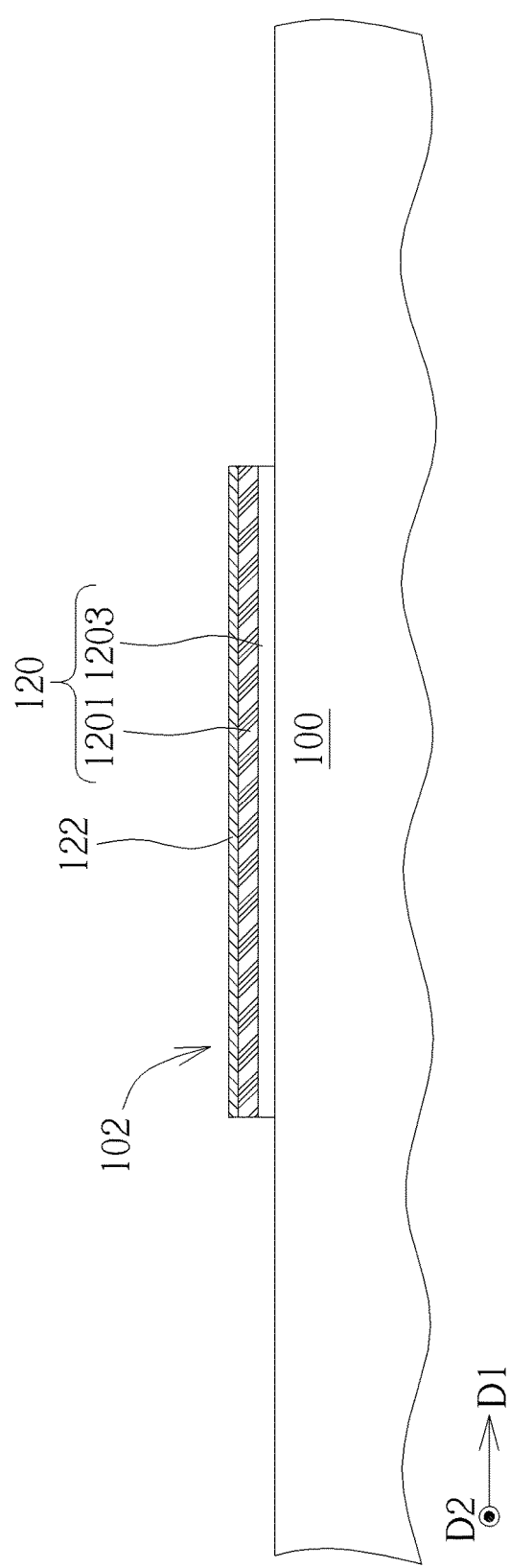

Referring to FIG. 13, FIG. 14, and FIG. 15, FIGS. 13-15 are schematic diagrams illustrating a method of forming the connecting bridges according to a first variant embodiment of the first embodiment of the present invention. As shown in FIG. 13 and FIG. 14, the main difference between this variant embodiment and the first embodiment is that the stacking layer structure of the metal layer 106 in this variant embodiment includes the silver layer 1061 and the molybdenum layer 1063 but does not include the aluminum layer 1062. In this variant embodiment, the thickness of the silver layer 1061 is about 75 angstroms to about 1000 angstroms, and the thickness of the molybdenum layer 1063 is about 100 angstroms to about 1000 angstroms, but not limited thereto. In addition, the silver layer 1061 is still the top one of the metallic material layers of the stacking layer structure in order to be in contact with the sulfur contained photoresist layer 108, and thus a portion of the silver layer 1061 can be reacted with the sulfur to form the silver sulfide layer 110. Next, the baking processes, the photolithography process, the etching process, and the process of removing the remaining photoresist layer can be performed to form the connecting bridge 102 shown in FIG. 15. The above processes can be the same as the first embodiment and can refer to FIG. 2 to FIG. 5, but not limited thereto. In short, the connecting bridges 102 of this variant embodiment includes the patterned silver sulfide layer 122 and the patterned metal layer 120, wherein the patterned metal layer 120 only includes the patterned silver layer 1201 and the patterned molybdenum layer 1203 but not include the patterned aluminum layer 1202. In addition, in some embodiments, the thickness of the silver layer 1061 is thinner and/or the reaction time of the silver layer 1061 and the photoresist layer 108 is longer, such that the entire silver layer 1061 can be reacted with sulfur in the photoresist layer 108, and the silver sulfide layer 110 formed by the reaction can replace the silver layer 1061 completely. Under the circumstances, the connecting bridges 102 formed afterwards can only include the patterned silver sulfide layer 122 and the patterned molybdenum layer 1203.

Figure 16:
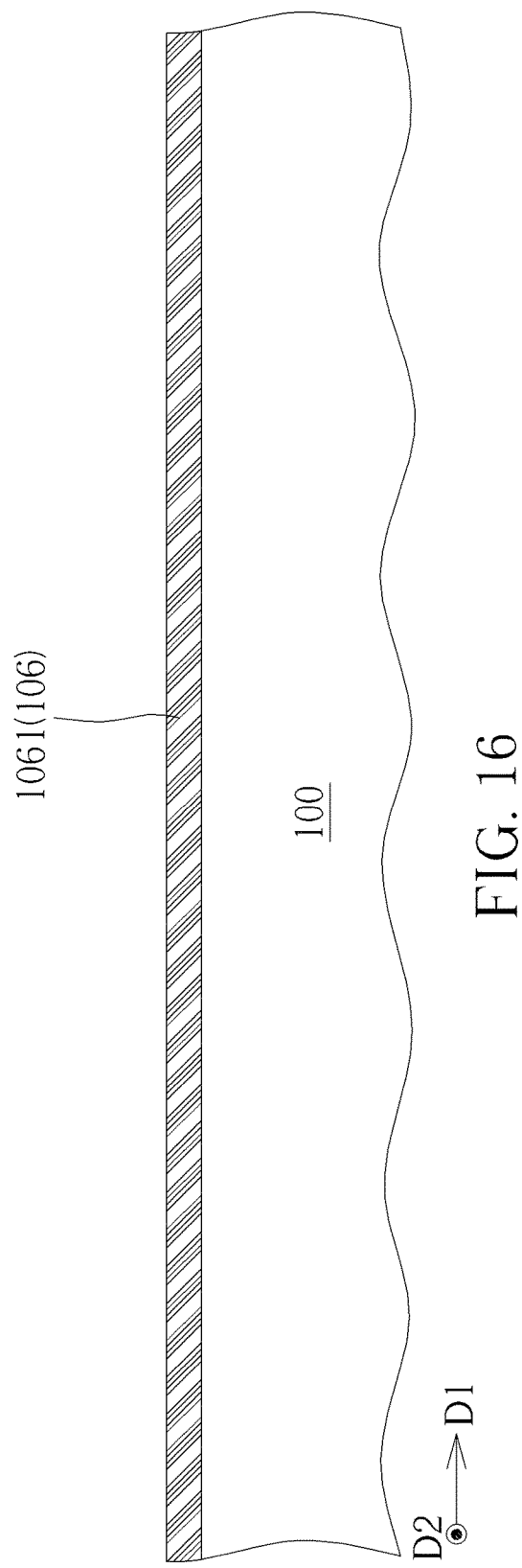
FIGS. 16-18 are schematic diagrams illustrating a method of forming the connecting bridges according to a second variant embodiment of the first embodiment of the present invention.
Figure 17:
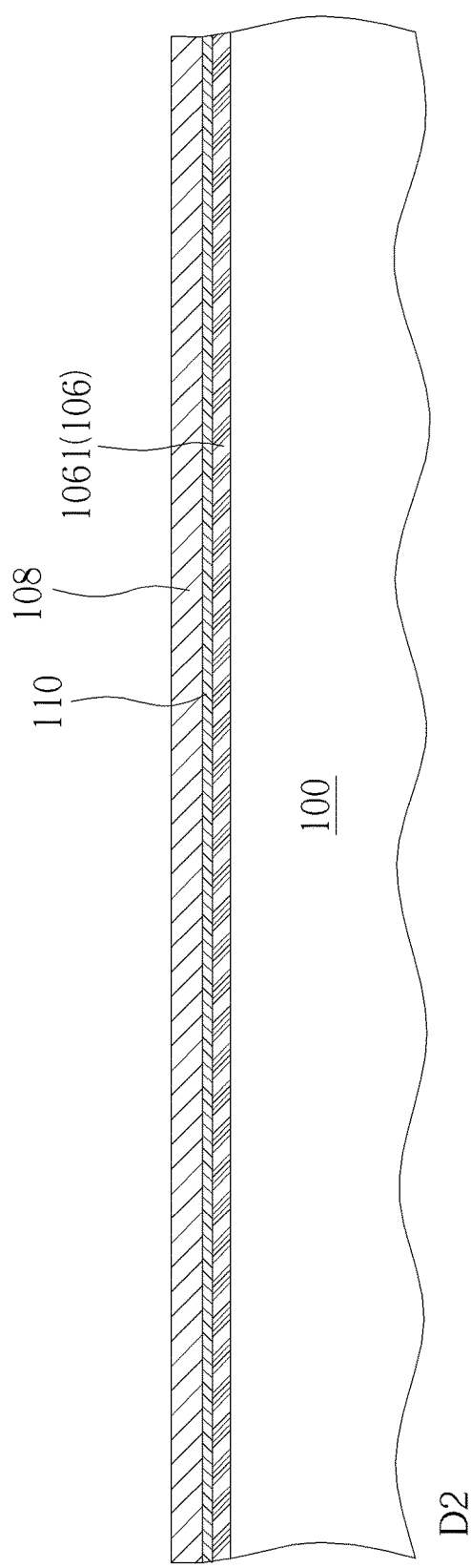
Figure 18:
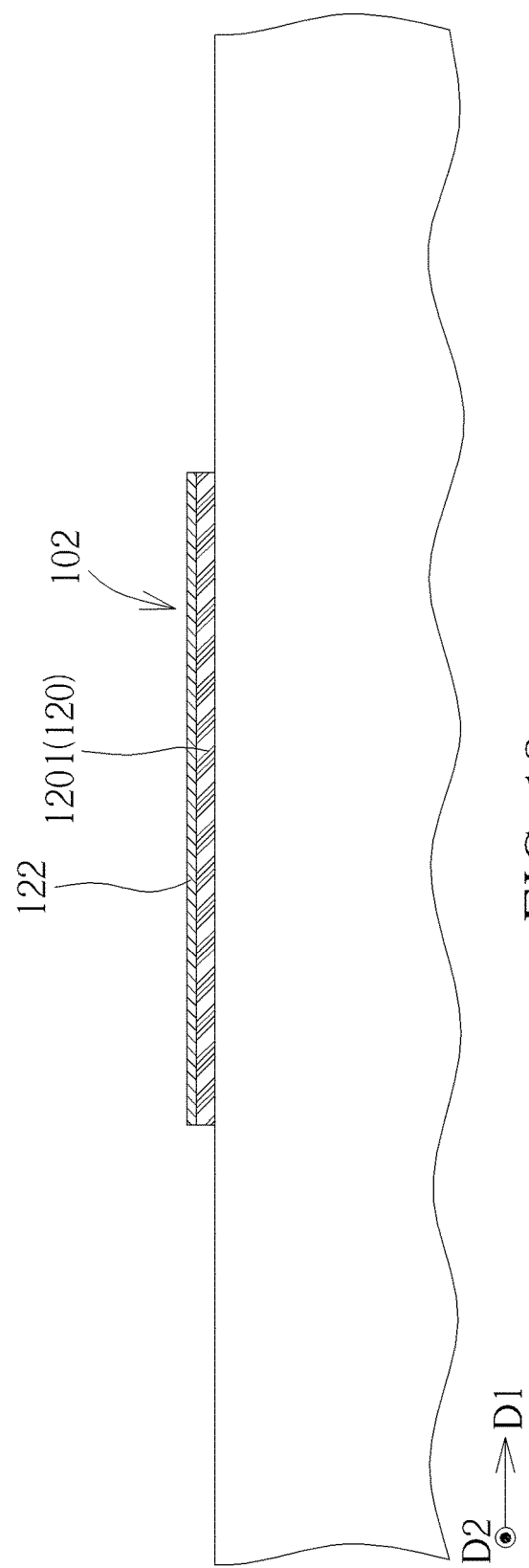

Referring to FIG. 16, FIG. 17, and FIG. 18, FIGS. 16-18 are schematic diagrams illustrating a method of forming the connecting bridges according to a second variant embodiment of the first embodiment of the present invention. As shown in FIG. 16 and FIG. 17, the main difference between this variant embodiment and the first embodiment is that the metal layer 106 is the silver layer 1061 and does not include the aluminum layer 1062 and the molybdenum layer 1063, and therefore the metal layer 106 of this variant embodiment is a single layer structure. In this variant embodiment, the thickness of the silver layer 1061 is about 75 angstroms to about 1000 angstroms, but not limited thereto. Similar to the above embodiments, the silver layer 1061 of this variant embodiment can react with the sulfur contained photoresist layer 108 disposed on the surface of the silver layer 1061 to form the silver sulfide layer 110. Next, the baking processes, the photolithography process, the etching process, and the process of removing the remaining photoresist layer can be performed to form the connecting bridge 102 shown in FIG. 18. The above processes can be the same as the first embodiment and can refer to FIG. 2 to FIG. 5, and thus the above processes are not redundantly described herein, but not limited thereto. In short, the connecting bridges 102 of this variant embodiment include the patterned silver sulfide layer 122 and the patterned metal layer 120, wherein the patterned metal layer 120 only includes the patterned silver layer 1201.

Figure 19:
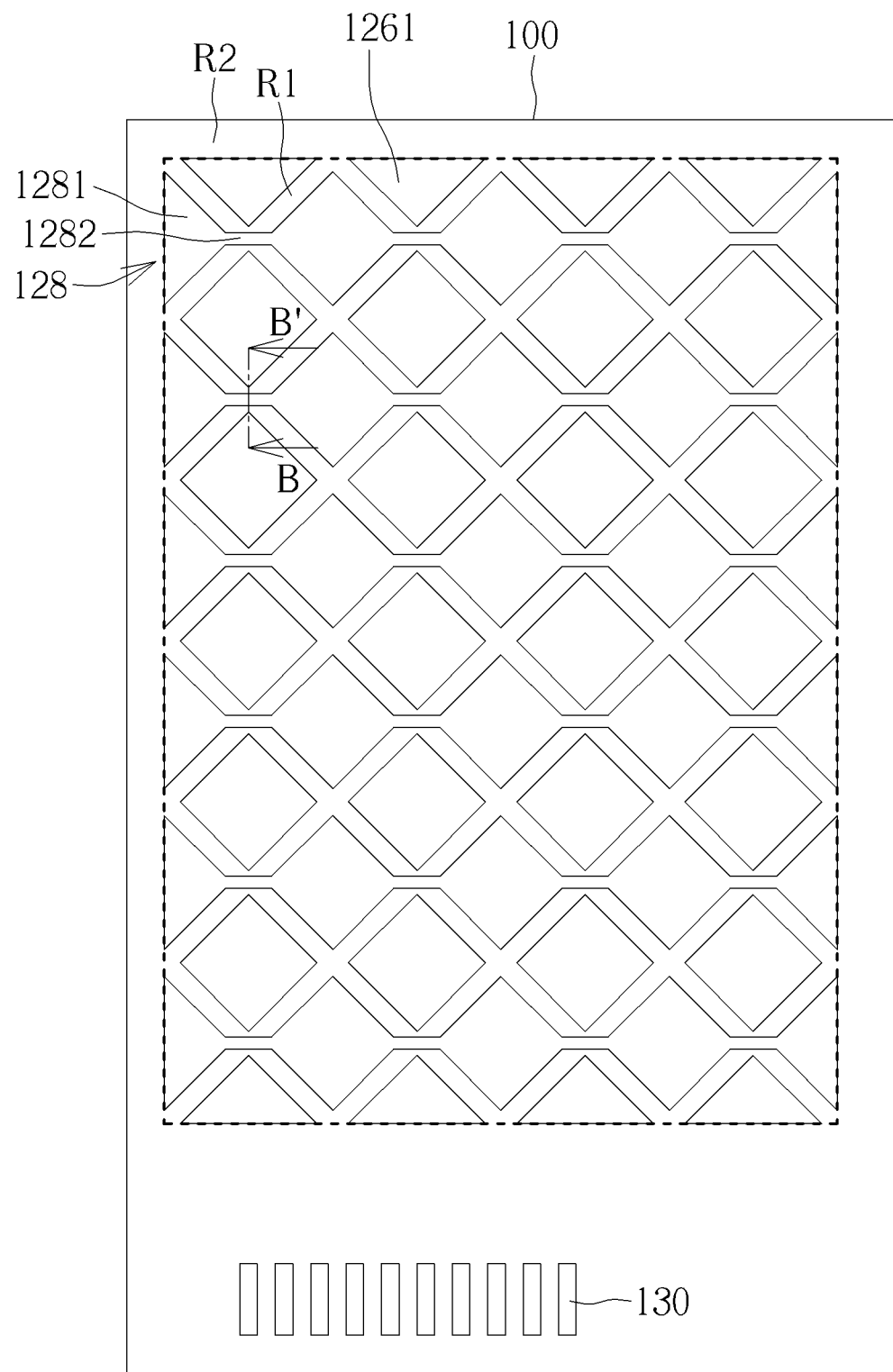
FIGS. 19-24 are schematic diagrams illustrating a manufacturing method of a touch panel according to a second embodiment of the present invention.
Figure 20:
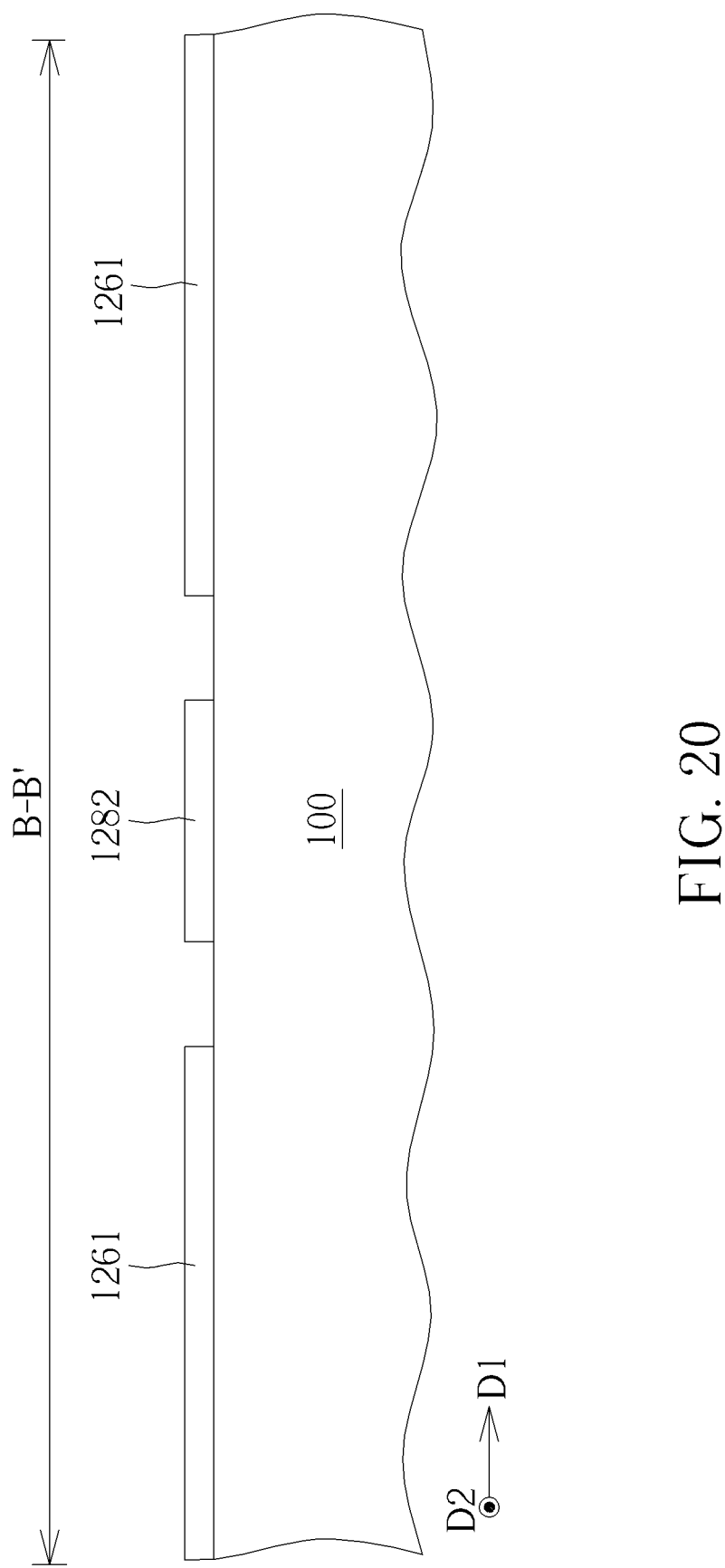
Figure 21:
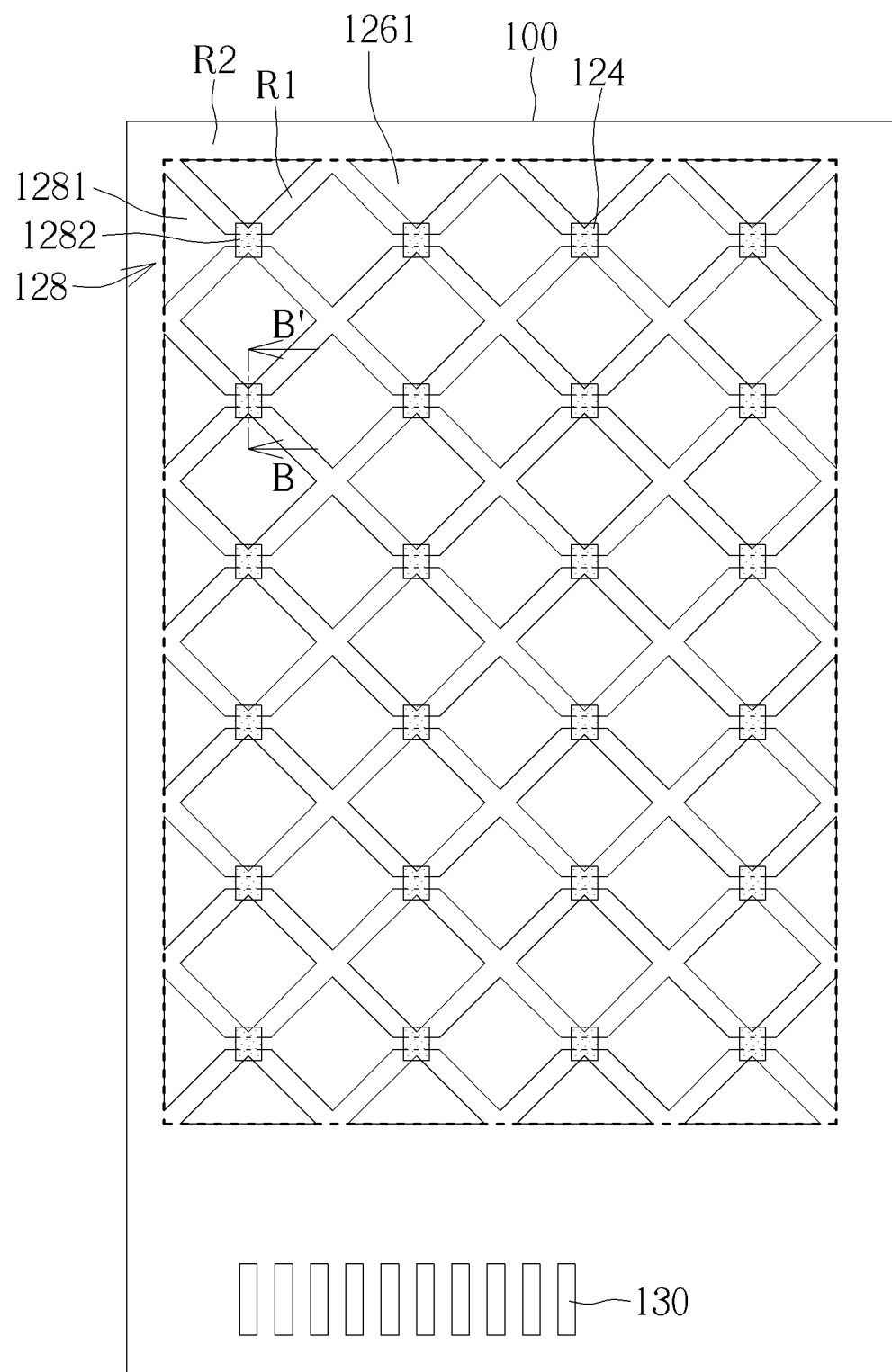
Figure 22:
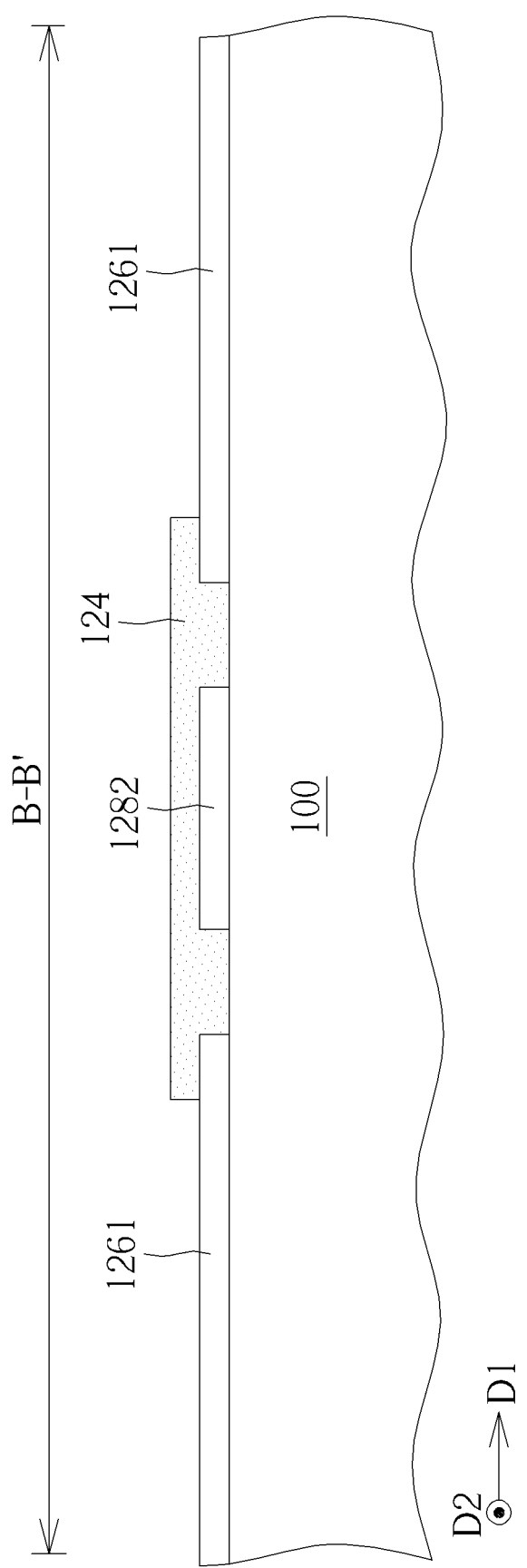
Figure 23:
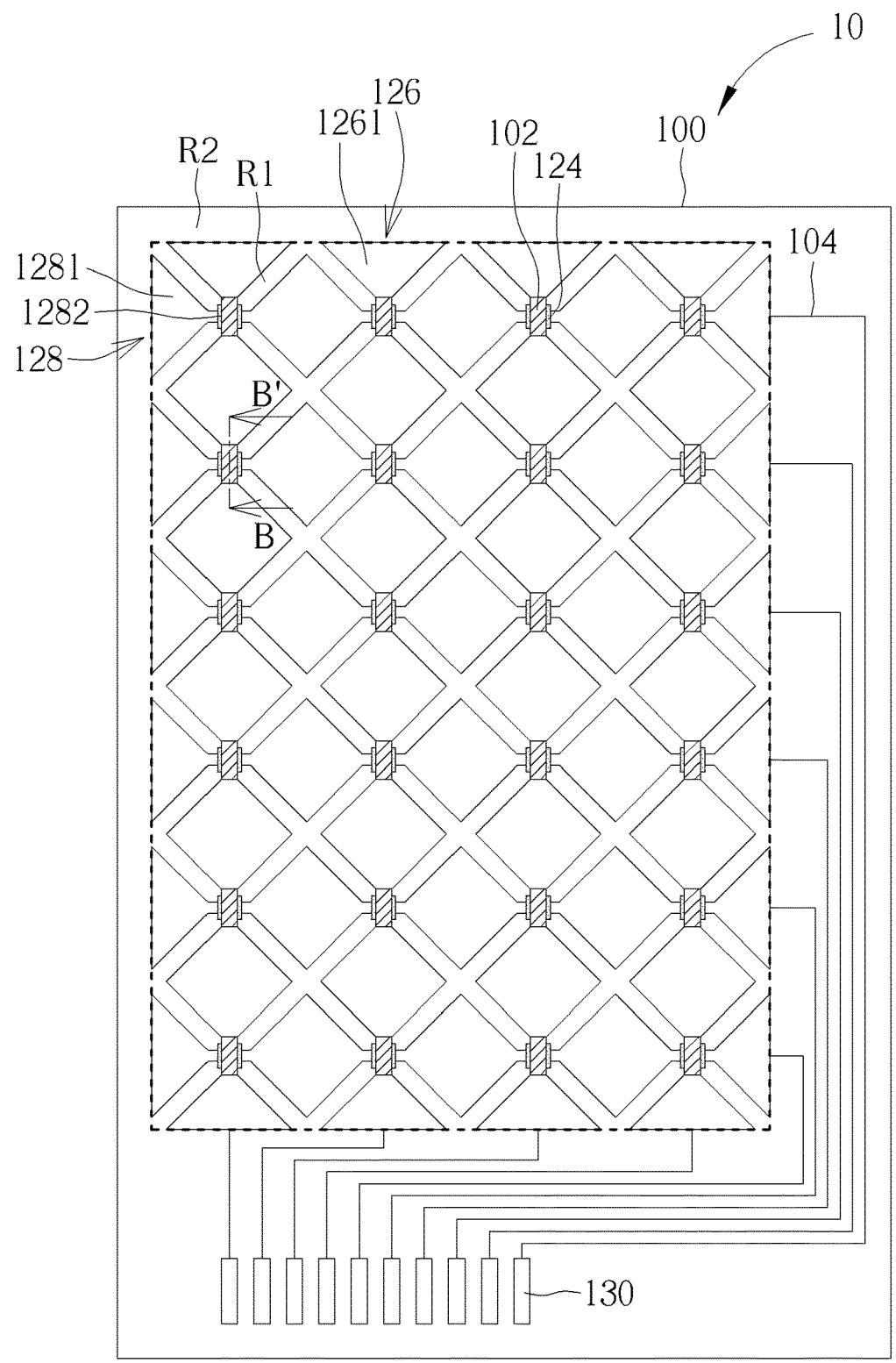
Figure 24:
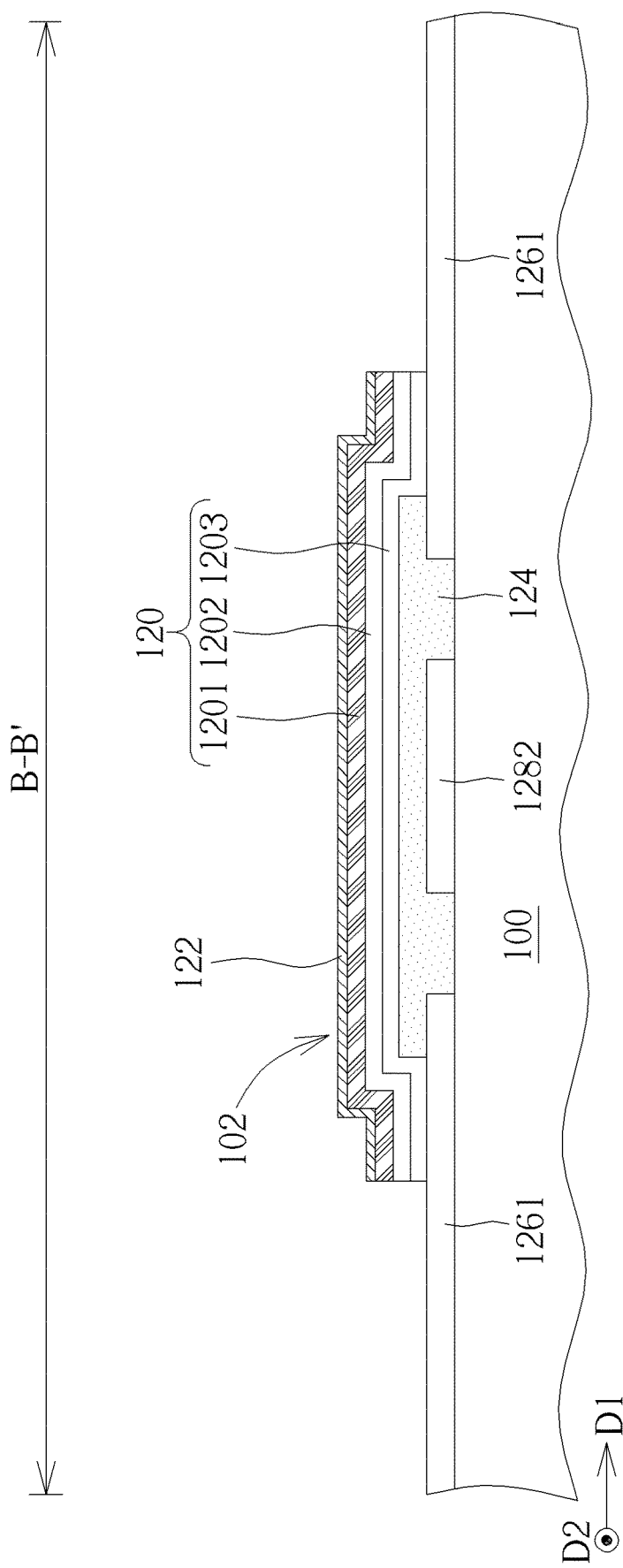

Referring to FIG. 19 to FIG. 24, FIGS. 19-24 are schematic diagrams illustrating a manufacturing method of a touch panel according to a second embodiment of the present invention, wherein FIG. 19, FIG. 21, and FIG. 23 are top view diagrams, and FIG. 20, FIG. 22, and FIG. 24 are cross-sectional diagrams taken along lines B-B' in FIG. 19, FIG. 21, and FIG. 23. The manufacturing method of the touch panel in this embodiment includes the following steps. First, as shown in FIG. 19 and FIG. 20, the patterned transparent conductive layer is formed on the substrate 100, and the patterned transparent conductive layer includes the first sensing electrodes 1261, the second sensing electrodes 1281, and the connecting lines 1282 disposed in the active region R1. Two adjacent second sensing electrodes 1281 are connected by one of the connecting lines 1282, and the second sensing electrodes 1281 and the connecting lines 1282 form multiple second sensing electrode series 128. In addition, the patterned transparent conductive layer includes the bonding pads 130 disposed in the peripheral region R2. The method of forming the patterned transparent conductive layer can be the same as the first embodiment, and therefore it is not redundantly described herein. Next, as shown in FIG. 21 and FIG. 22, the insulating islands 124 are formed in the active region R1 and on the substrate 100, wherein each insulating island 124 is disposed corresponding to one of the connecting lines 1282. Each insulating island 124 partially covers the corresponding connecting line 1282 and fills in the gaps between the first sensing electrodes 1261 and the connecting lines 1282. The method of forming the insulating islands 124 can be the same as the first embodiment, and therefore it is not redundantly described herein.

Next, as shown in FIG. 23 and FIG. 24, the connecting bridges 102 and the traces 104 are formed on the substrate 100, wherein the connecting bridges 102 are disposed in the active region R1, and the traces 104 are disposed in the peripheral region R2. Each connecting bridge 102 is disposed corresponding to one of the insulating islands 124, wherein each connecting bridge 102 partially covers the corresponding insulating island 124 and extends across the corresponding insulating island 124 to connect the first sensing electrodes 1261 disposed at two sides of the corresponding insulating island 124. Accordingly, two adjacent first sensing electrodes 1261 can be connected by at least one of the connecting bridges 102, and the first sensing electrodes 1261 and the connecting bridges 102 form multiple first sensing electrode series 126. The structure of the connecting bridges 102 of this embodiment can be the same as that of the first embodiment. The connecting bridges 102 can include the patterned metal layer 120 and the patterned silver sulfide layer 122, wherein the patterned metal layer 120 includes the patterned silver layer 1201, the patterned aluminum layer 1202, and the patterned molybdenum layer 1203, and the patterned silver sulfide layer 122 covers the patterned silver layer 1201. In addition, the method of forming the connecting bridges 102 can refer to the first embodiment, and it is not redundantly described herein. Note that the structure of the connecting bridges 102 of this embodiment is not limited to the example shown in FIG. 24. For example, the connecting bridges 102 of this embodiment can have the stacking layer structure of the first variant embodiment or the single layer structure of the second variant embodiment, wherein the connecting bridges 102 can at least include the patterned silver layer 1201 and the patterned silver sulfide layer 122 that covers the patterned silver layer 1201, or the connecting bridges 102 of this embodiment may include the patterned metal layer 120 and the patterned silver sulfide layer 122 that covers the patterned metal layer 120, wherein the patterned metal 120 does not include the patterned silver layer 1201 contacting the patterned silver sulfide layer 122 (i.e. entire silver layer 1061 of the metal layer 106 reacts with sulfur in the photoresist layer 108, and the silver sulfide layer 110 formed by the reaction replaces the silver layer 1061 completely). In FIG. 23, two adjacent first sensing electrodes 1261 are electrically connected by one connecting bridge 102, but not limited thereto. In a variant embodiment, two adjacent first sensing electrodes 1261 are electrically connected by multiple connecting bridges 102. In addition, one end of each trace 104 can be connected to one of the first sensing electrode series 126 or one of the second sensing electrode series 128, and another end of each trace 104 can be connected to one of the bonding pads 130. Details of the manufacturing methods of the touch panel 10 and the connecting bridges 102 of this embodiment can refer to the first embodiment, and they are not redundantly described herein.

Figure 25:
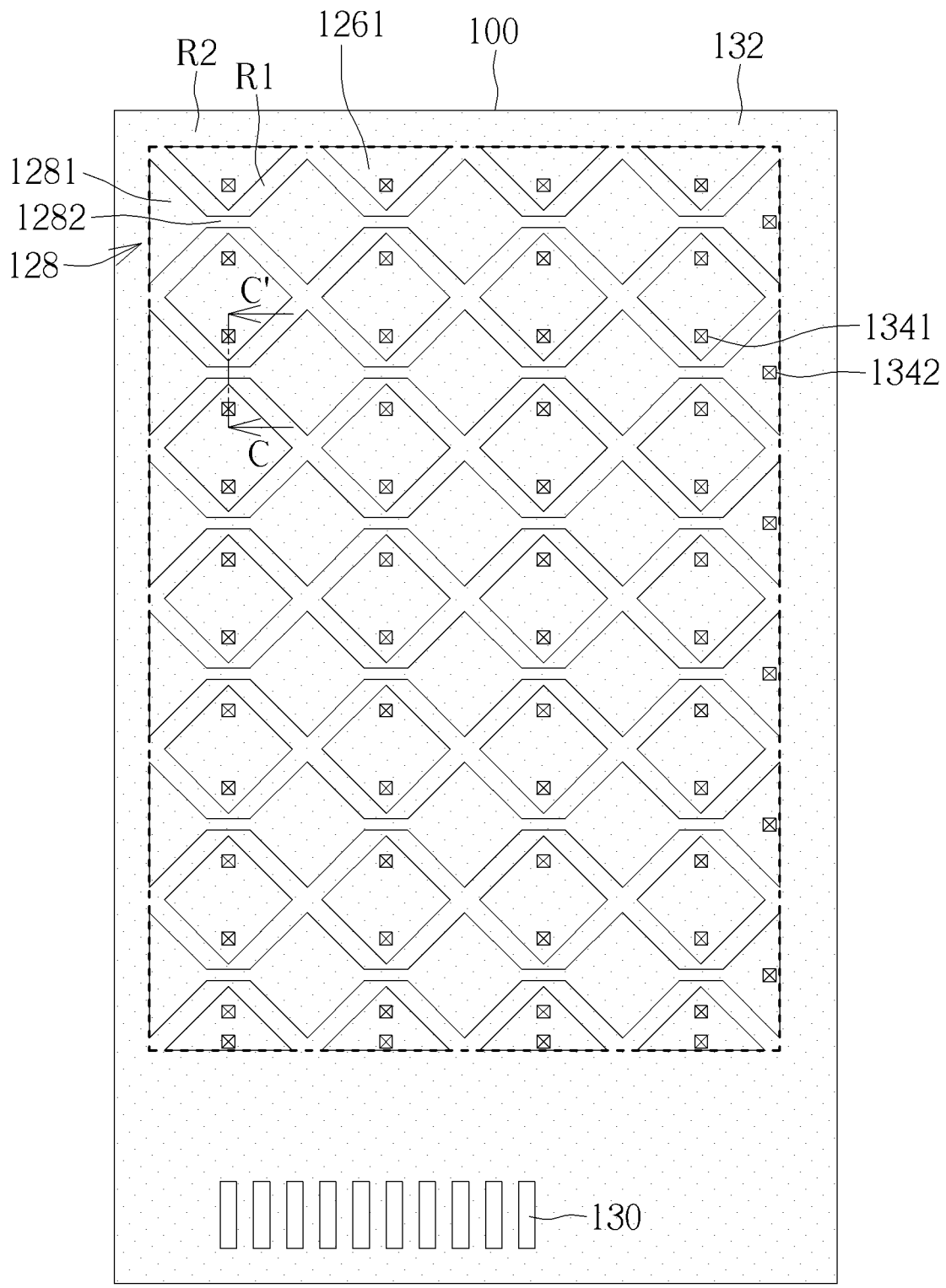
FIGS. 25-28 are schematic diagrams illustrating a manufacturing method of a touch panel according to a third embodiment of the present invention.
Figure 26:
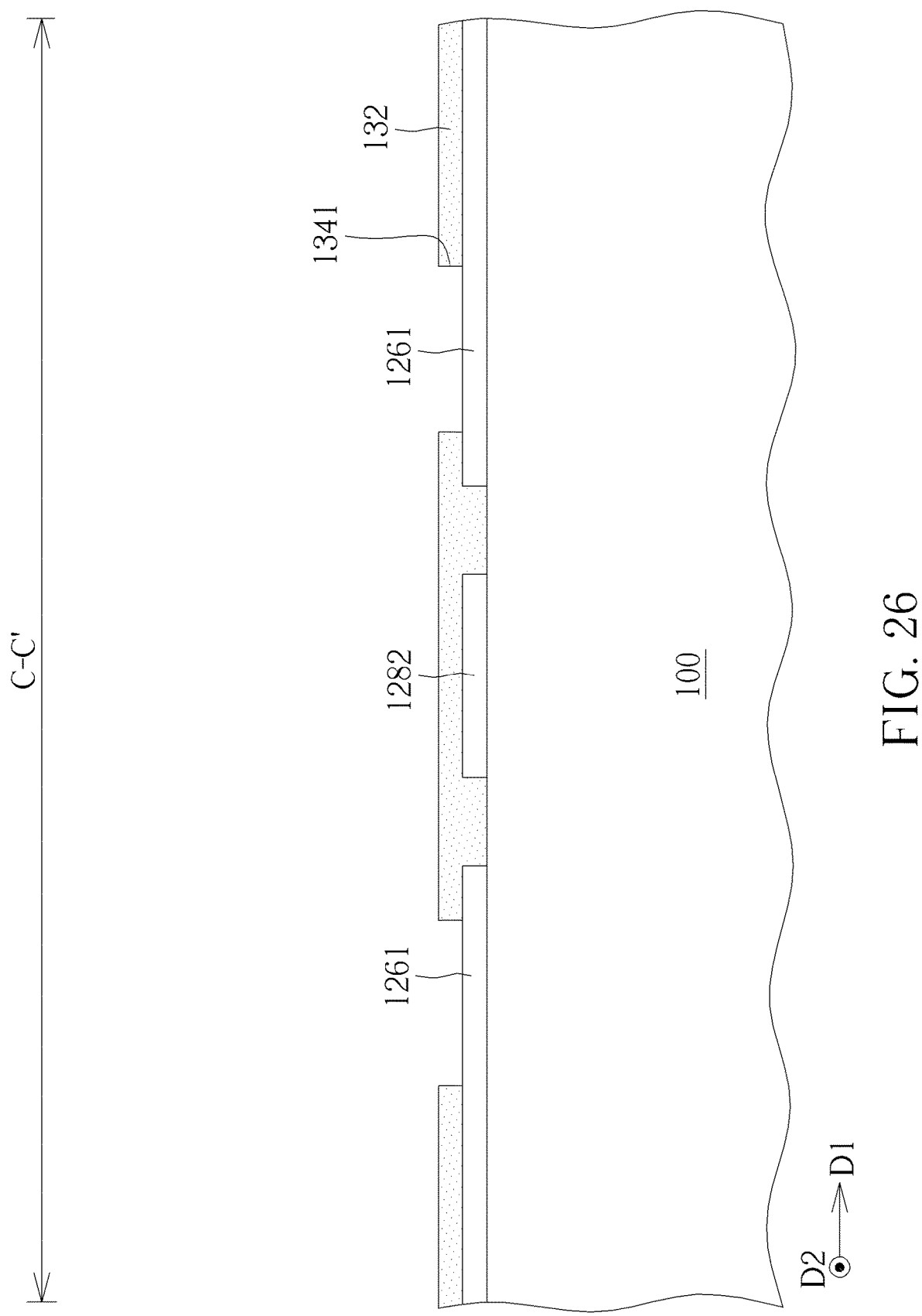
Figure 27:
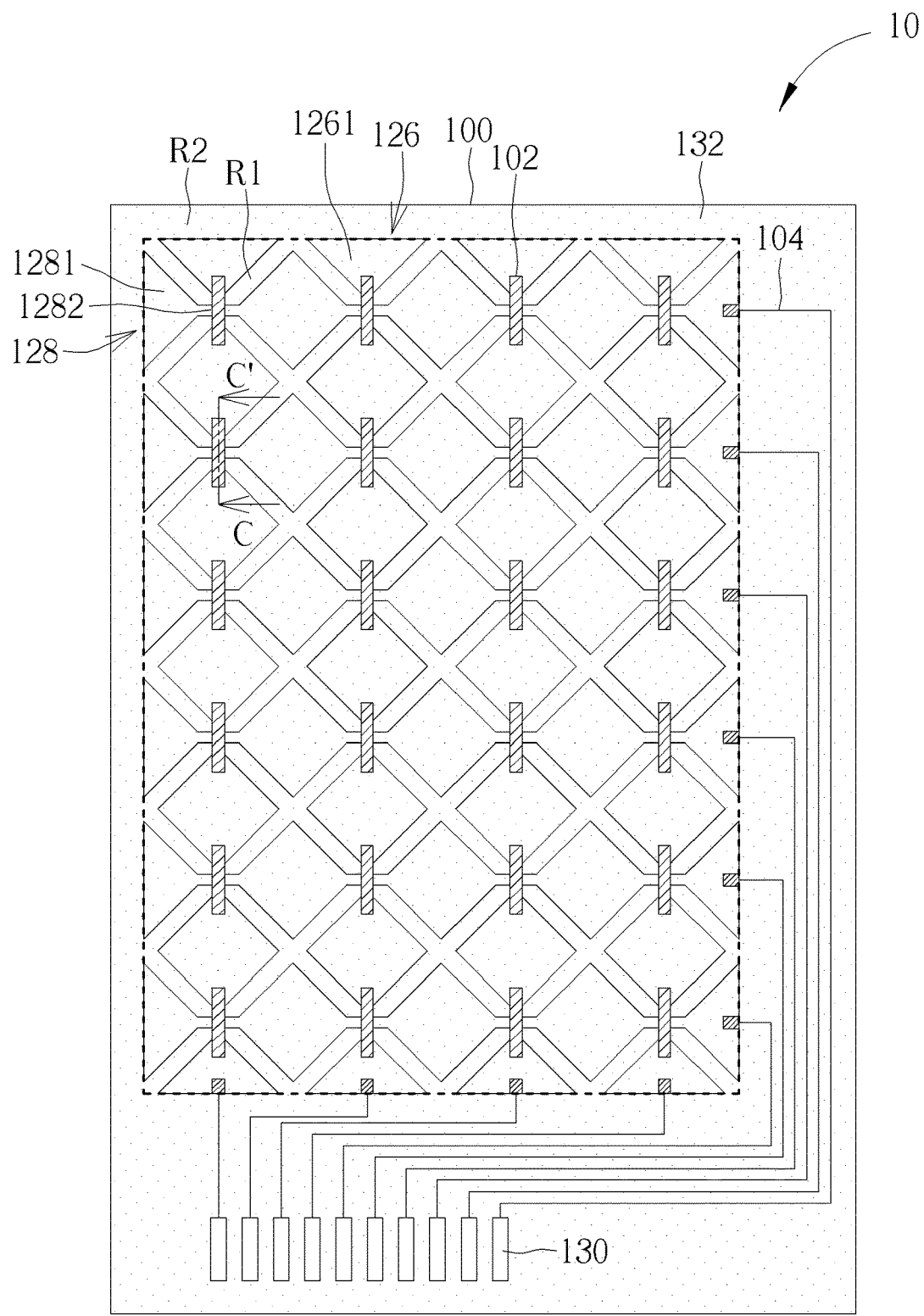
Figure 28:
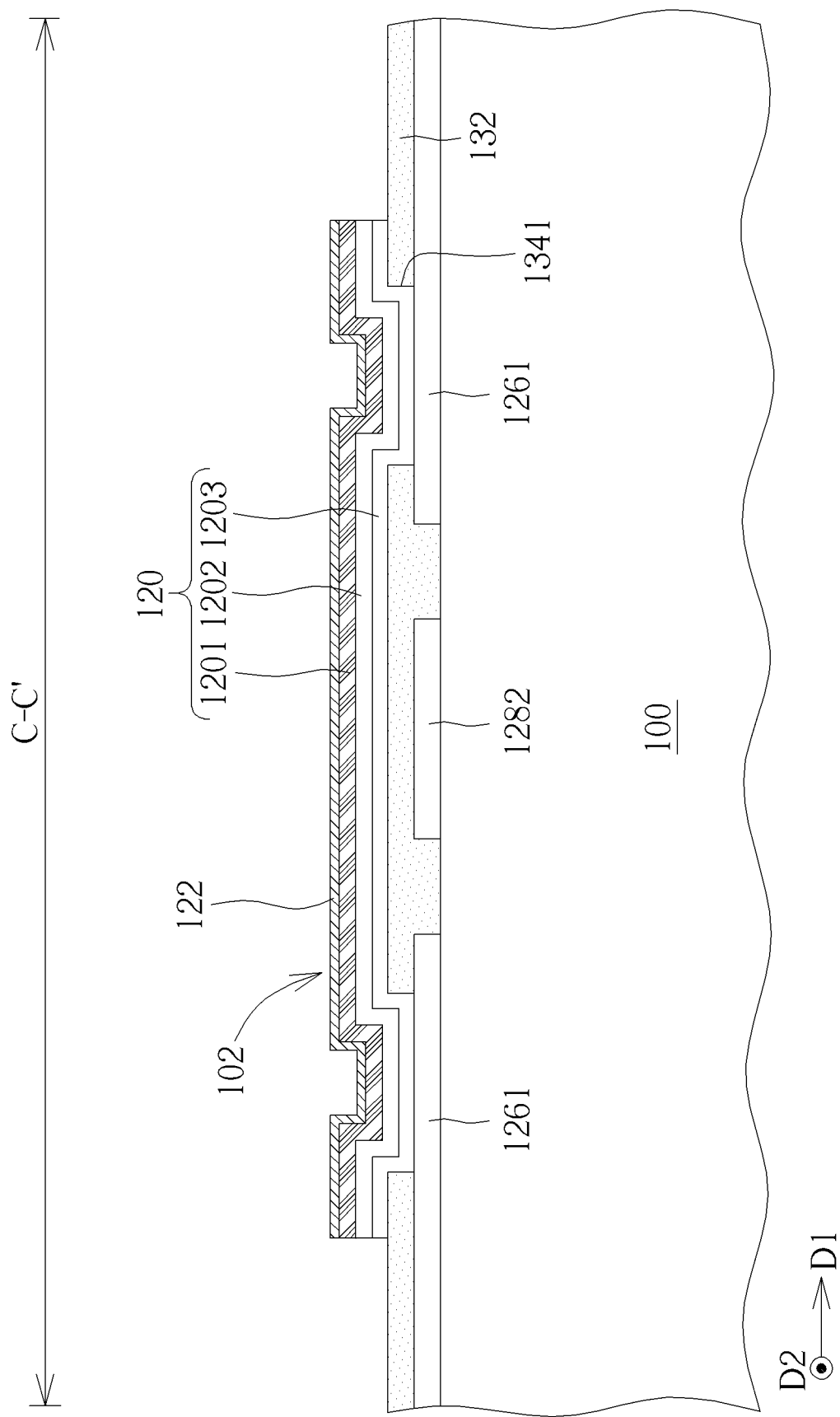

Referring to FIG. 25 to FIG. 28, FIGS. 25-28 are schematic diagrams illustrating a manufacturing method of a touch panel according to a third embodiment of the present invention, wherein FIG. 25 and FIG. 27 are top view diagrams, and FIG. 26 and FIG. 28 are cross-sectional diagrams taken along lines C-C' in FIG. 25 and FIG. 27. In the third embodiment, the process shown in FIG. 25 and FIG. 26 is performed after the process shown in FIG. 19 and FIG. 20. As shown in FIG. 25 and FIG. 26, a patterned insulating layer 132 is formed on the substrate 100 to cover the first sensing electrodes 1261 and the second sensing electrode series 128 after the first sensing electrodes 1261, the second sensing electrodes 1281, and the connecting lines 1282 are formed. The patterned insulating layer 132 of this embodiment includes a plurality of contact holes 1341 and a plurality of contact holes 1342. Each contact hole 1341 exposes a portion of one of the first sensing electrodes 1261, and each contact hole 1342 exposes a portion of one of the first sensing electrodes 1261 or a portion of one of the second sensing electrodes 1281 that is disposed at the edge of the active region R1. The method of forming the patterned insulating layer 132 of this embodiment may, for example, include forming an insulating layer on the substrate 100 entirely first, and performing a patterning process on the insulating layer to form the contact holes 1341 and the contact holes 1342 next, but not limited thereto.

Next, as shown in FIG. 27 and FIG. 28, the connecting bridges 102 and the traces 104 are formed on the patterned insulating layer 132. The connecting bridges 102 are disposed in the active region R1, and the traces 104 are disposed in the peripheral region R2. In this embodiment, each connecting bridge 102 is disposed between two adjacent first sensing electrodes 1261, wherein each connecting bridge 102 fills into the corresponding contact holes 1341 and contacts the portions of the first sensing electrodes 1261 exposed by the corresponding contact holes 1341. In short, each connecting bridge 102 is electrically connected to the exposed first sensing electrodes 1261 through the contact holes 1341, and therefore each of the connecting bridges 102 is electrically connected to adjacent two of the first sensing electrodes 1261 through two of the contact holes 1341. Accordingly, two adjacent first sensing electrodes 1261 can be connected by at least one of the connecting bridges 102, and the first sensing electrodes 1261 and the connecting bridges 102 can form multiple first sensing electrode series 126. The structure of the connecting bridges 102 of this embodiment can be the same as that of the first embodiment. The connecting bridges 102 can include the patterned metal layer 120 and the patterned silver sulfide layer 122, wherein the patterned metal layer 120 includes the patterned silver layer 1201, the patterned aluminum layer 1202, and the patterned molybdenum layer 1203, and the patterned silver sulfide layer 122 covers the patterned silver layer 1201. In addition, the method of forming the connecting bridges 102 can refer to the first embodiment, and it is not redundantly described herein. Note that the structure of the connecting bridges 102 of this embodiment is not limited to the example shown in FIG. 28. For example, the connecting bridges 102 of this embodiment can have the stacking layer structure of the first variant embodiment or the single layer structure of the second variant embodiment, wherein the connecting bridges 102 can at least include the patterned silver layer 1201 and the patterned silver sulfide layer 122 that covers the patterned silver layer 1201, or the connecting bridges 102 of this embodiment may include the patterned metal layer 120 and the patterned silver sulfide layer 122 that covers the patterned metal layer 120, wherein the patterned metal 120 does not include the patterned silver layer 1201 contacting the patterned silver sulfide layer 122. In addition, one end of each trace 104 can electrically connect one of the first sensing electrodes 1261 or one of the second sensing electrodes 1281 disposed at the edge of the active region R1 through the corresponding contact hole 1342, such that each trace 104 can be electrically connected to one of the first sensing electrode series 126 or one of the second sensing electrode series 128. Further, another end of each trace 104 connects one of the bonding pads 130. Other details of the manufacturing methods of the touch panel 10 and the connecting bridges 102 of this embodiment can refer to the above embodiments, and they are not redundantly described herein.

Figure 29:
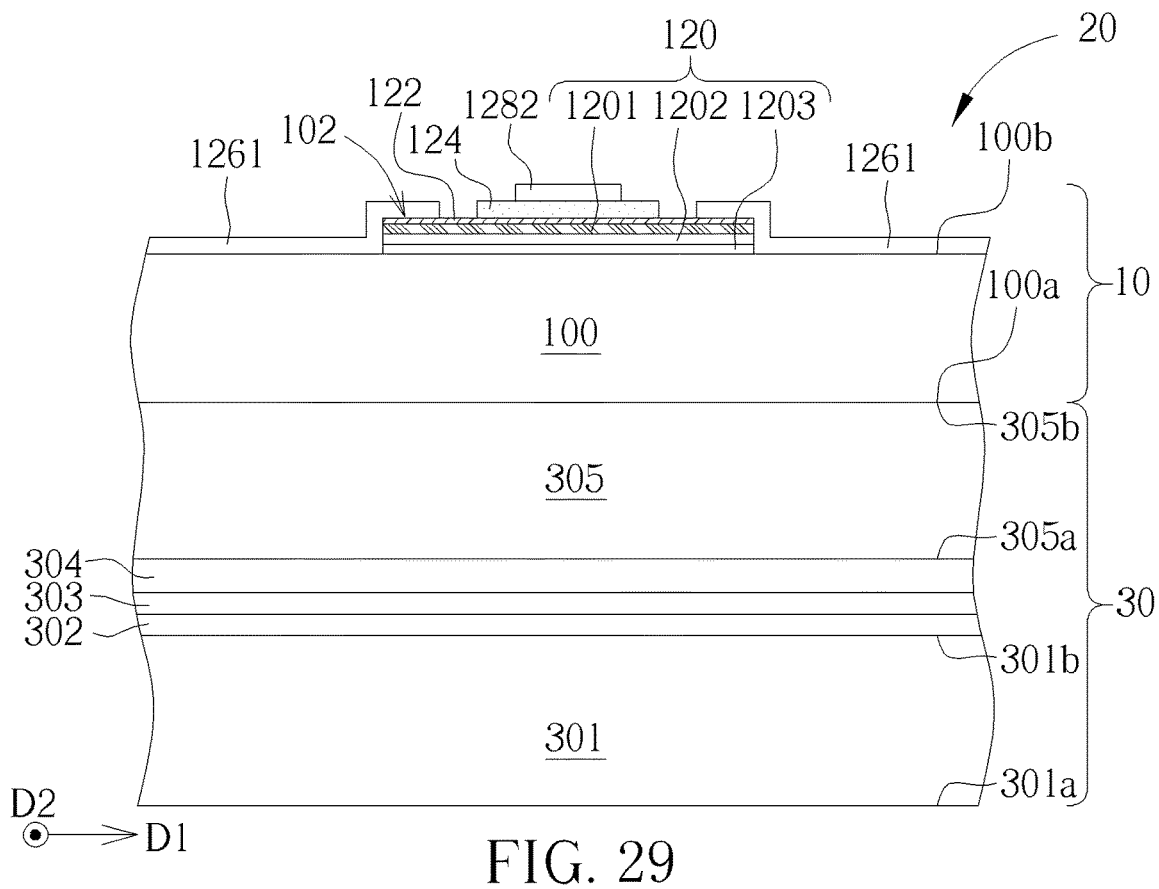
FIG. 29 is a schematic diagram illustrating a cross-sectional view of a touch display device according to the first embodiment.

Referring to FIG. 29, FIG. 29 is a schematic diagram illustrating a cross-sectional view of a touch display device according to the first embodiment. As shown in FIG. 29, the touch display device 20 includes the touch panel 10 and a display panel 30. The touch panel 10 can be any touch panel disclosed in the above embodiments. The display panel 30 includes a lower substrate 301, at least one thin film transistor (TFT) 302, a first electrode 303, a display medium layer 304, and an upper substrate 305. The lower substrate 301 includes a first surface 301a and a second surface 301b opposite to the first surface 301a, the upper substrate 305 includes a third surface 305a and a fourth surface 305b opposite to the third surface 305a, and the touch panel 10 is disposed on the fourth surface 305b of the upper substrate 305 that is opposite to the display medium layer 304. The display medium layer 304 may be a liquid crystal layer or light emitting diode device layer, but not limited thereto. For example, when the display panel 30 is a liquid crystal display panel, the display medium layer 304 can be the liquid crystal layer, the first electrode 303 can be a pixel electrode, and the TFT 302 can be disposed on the lower substrate 301 and electrically connected to the first electrode 303. Since the structure of the TFT 302 and the connection between the TFT 302 and the first electrode 303 are general technologies in this field, they are not redundantly described herein, and they are not shown in FIG. 29 to simplify the figure. The TFT 302 may be the top gate TFT or the bottom gate TFT, and the TFT 302 may be amorphous silicon TFT, low temperature polysilicon (LTPS) TFT, indium gallium zinc oxide (IGZO) TFT, or other suitable TFTs. Additionally, the display panel 30 further includes a second electrode (not shown in the figure) serving as the common electrode, and the second electrode can be disposed between the lower substrate 301 and the display medium layer 304 or between the upper substrate 305 and the display medium layer 304. Gate lines, data lines, an alignment layer, or the combination thereof may be disposed between the lower substrate 301 and the display medium layer 304, but not limited thereto. A color filter layer, a shielding layer (or so-called as black matrix layer), an alignment layer, or the combination thereof may be disposed between the upper substrate 305 and the display medium layer 304, but not limited thereto. In the embodiment of color filter on array (COA) or black matrix on array (BOA), at least one of the color filter layer or the shielding layer is disposed between the lower substrate 301 and the display medium layer 304. When the display panel 30 is an active organic light emitting display panel, the display medium layer 304 can be an organic light emitting diode device layer which includes an organic light emitting layer. The organic light emitting diode device layer can have a stacking layer structure. For example, the organic light emitting diode device layer can include a hole transporting layer, the organic light emitting layer, and an electron transporting layer, but not limited thereto. When the display panel 30 is a micro-LED display panel, the display medium layer 304 can be a light emitting diode device layer which includes a p-n diode layer. For example, the p-n diode layer can include a p-doped layer and an n-doped layer. Additionally, in some embodiments, the p-n diode layer can further include a quantum well layer disposed between the p-doped layer and the n-doped layer, but not limited thereto. In the above embodiments of the active organic light emitting display panel and the micro-LED display panel, the TFT 302 is disposed on the lower substrate 301 and electrically connected to the first electrode 303, and the first electrode 303 is electrically connected to the display medium layer 304. In addition, the display panel 30 further includes the second electrode (not shown in the figure) disposed between the display medium layer 304 and the upper substrate 305, and the second electrode is electrically connected to the display medium layer 304. One of the first electrode 303 and the second electrode is cathode and another one of the first electrode 303 and the second electrode is anode, so as to drive the organic light emitting layer or the p-n diode layer to emit light. In the embodiment shown in FIG. 29, the touch display device 20 is an out-cell touch display device, wherein an adhesive layer (not shown in the figure) can be disposed between the touch panel 10 and the upper substrate 305, such that the touch panel 10 can be disposed on the fourth surface 305*b* of the upper substrate 305 through the adhesive layer, but not limited thereto. In addition, the lower substrate 301 and the upper substrate 305 of the display panel 30 in this embodiment can be regarded as a first substrate and a third substrate of the touch display device 20 respectively, and the substrate 100 of the touch panel 10 can be regarded as a second substrate of the touch display device 20.

Figure 30:
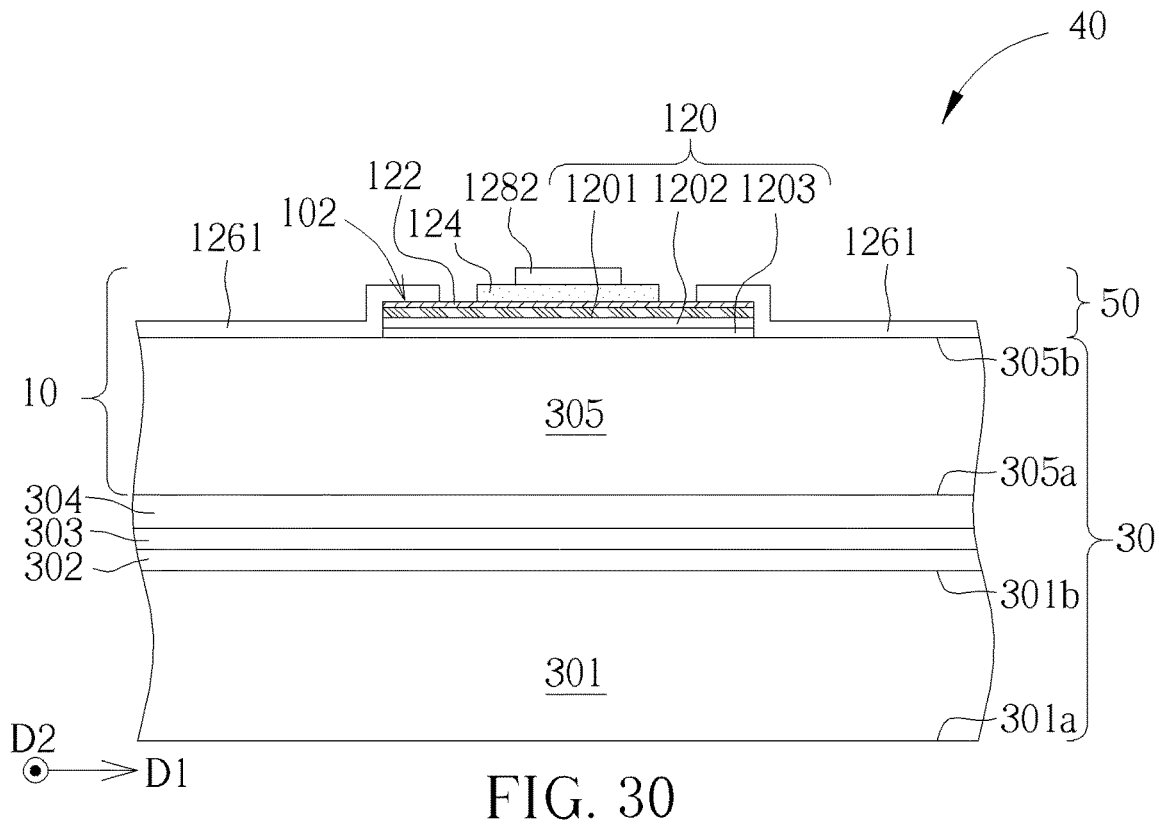
FIG. 30 is a schematic diagram illustrating a cross-sectional view of a touch display device according to the second embodiment.

Referring to FIG. 30, FIG. 30 is a schematic diagram illustrating a cross-sectional view of a touch display device according to the second embodiment. As shown in FIG. 30, the touch display device 40 includes a display panel 30 and a touch device layer 50, wherein each layer in the display panel 30 is similar to that described in the embodiment shown in FIG. 29, and it is not redundantly described herein. The touch device layer 50 is disposed on the fourth surface 305*b* of the upper substrate 305 that is opposite to the display medium layer 304. The touch device layer 50 can include the first sensing electrodes 1261, the second sensing electrodes 1281, the connecting bridges 102, the connecting lines 1282, the traces 104, and the bonding pads 130 disclosed in any embodiment described above. The upper substrate 305 and the touch device layer 50 form the touch panel 10. In the touch panel 10 of this embodiment, the upper substrate 305 can correspond to the substrate 100 of the touch panel 10 disclosed in any embodiment described above, and the touch panel 10 can be the touch panel disclosed in any embodiment described above. In this embodiment, the lower substrate 301 and the upper substrate 305 of the display panel 30 can be regarded as a first substrate and a second substrate of the touch display device 40 respectively. In this embodiment, the touch display device 40 is an on-cell touch display device, wherein the touch device layer 50 is directly disposed on the fourth surface 305*b* of the upper substrate 305 that is opposite to the display medium layer 304, such that the touch device layer 50 and the upper substrate 305 form the touch panel 10. The display panel 30 and the touch panel 10 share the upper substrate 305. For example, when the display panel 30 is a liquid crystal display panel, at least one TFT, gate lines, data lines, electrodes, an alignment layer, or the combination thereof can be disposed on the lower substrate 301, and a color filter layer, a shielding layer, electrodes, an alignment layer, or the combination thereof can be disposed on the upper substrate 305. After the above structures are formed, the liquid crystal layer is dispensed and formed on the lower substrate 301, and the lower substrate 301 is bonded with the upper substrate 305 to form the display panel 30. Next, the touch device layer 50 is disposed on the fourth surface 305*b* of the upper substrate 305 of the display panel 30 to form the touch display device 40, but not limited thereto. In other embodiments, the touch device layer 50 can be disposed on the fourth surface 305*b* of the upper substrate 305 before the lower substrate 301 is bonded with the upper substrate 305, and the lower substrate 301 is bonded with the upper substrate 305 later to form the touch display device 40. Comparing to the embodiment shown in FIG. 29, one substrate is omitted in the touch display device 40 of this embodiment, and therefore the touch display device 40 can be thinner.

Figure 31:
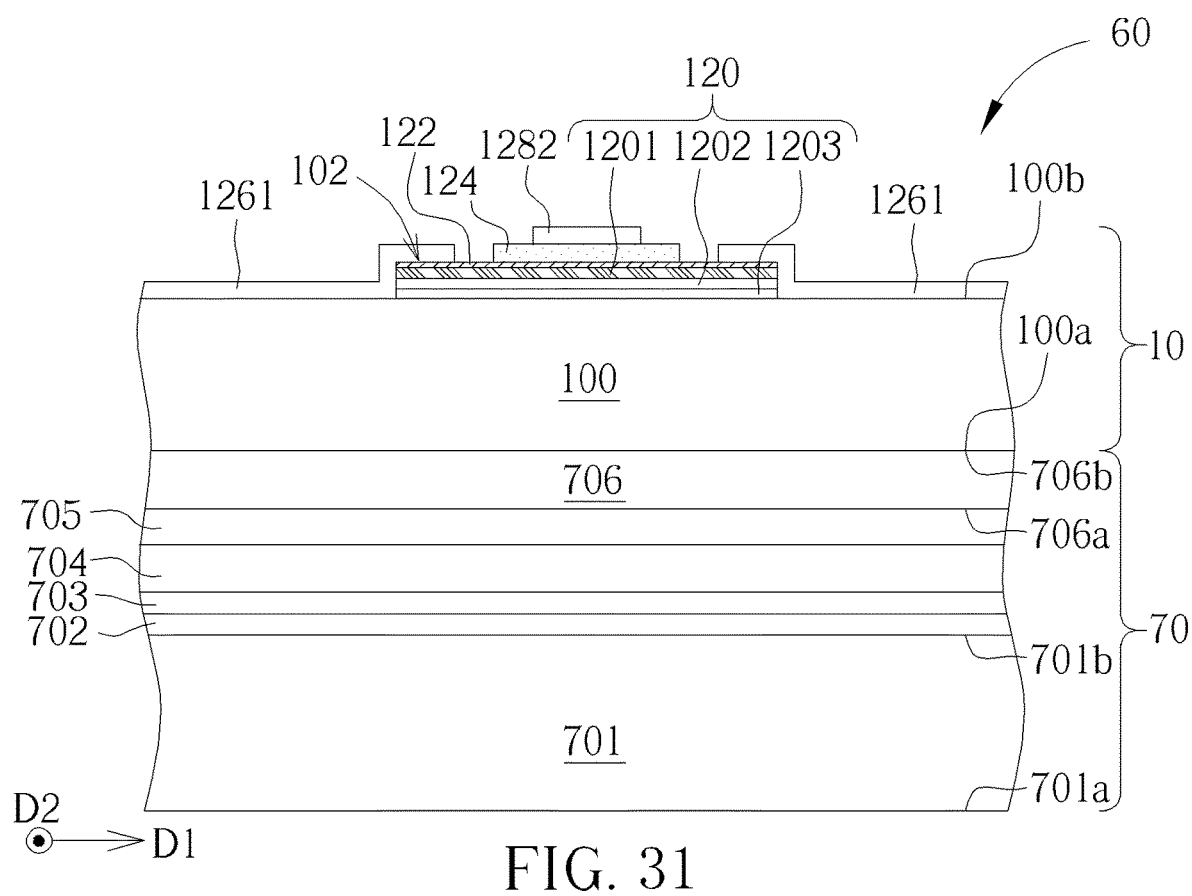
FIG. 31 is a schematic diagram illustrating a cross-sectional view of a touch display device according to the third embodiment.

Referring to FIG. 31, FIG. 31 is a schematic diagram illustrating a cross-sectional view of a touch display device according to the third embodiment. As shown in FIG. 31, the touch display device 60 includes the touch panel 10 and a display panel 70, wherein the touch panel 10 can be the touch panel disclosed in any embodiment described above. The display panel 70 includes a first substrate 701, at least one TFT 702, a first electrode 703, an organic light emitting diode device layer 704, a second electrode 705, and a thin film encapsulation layer 706. The first substrate 701 includes a first surface 701*a* and a second surface 701*b* opposite to the first surface 701*a*. The thin film encapsulation layer 706 includes a third surface 706*a* and a fourth surface 706*b* opposite to the third surface 706*a*, and the touch panel 10 is disposed on the fourth surface 706*b* of the thin film encapsulation layer 706 that is opposite to the organic light emitting diode device layer 704. In this embodiment, the first substrate 701 of the display panel 70 and the substrate 100 of the touch panel 10 can be regarded as a first substrate and a second substrate of the touch display device 60 respectively. One of the first electrode 703 and the second electrode 705 can be cathode and another one of the first electrode 703 and the second electrode 705 can be anode, so as to drive the organic light emitting diode device layer 704 to emit light. The display panel 70 of this embodiment is an active organic light emitting display panel. For example, the display panel 70 can be a flexible active organic light emitting display panel, and the touch panel 10 can be a flexible touch panel. In addition, the first substrate 701 of the display panel 70 and the substrate 100 of the touch panel 10 are flexible substrates, so as to make the touch display device 60 be flexible. The thin film encapsulation layer 706 disposed in the display panel 70 is required being flexible, and the thin film encapsulation layer 706 covers the organic light emitting diode device layer 704 to prevent oxygen and moisture from entering the organic light emitting diode device layer 704. In the embodiment shown in FIG. 31, the touch panel 10 can be disposed on the fourth surface 706*b* of the thin film encapsulation layer 706 that is opposite to the organic light emitting diode device layer 704 through an adhesive layer (not shown in the figure), but not limited thereto. In addition, although the structures of the touch panels 10 shown in FIG. 29 to FIG. 31 are the same as the structure of the first embodiment, but they are not limited thereto. The touch panels 10 in FIG. 29 to FIG. 31 can also have the same structure as the touch panels 10 in the second embodiment or the third embodiment. Additionally, the connecting bridges 102 of the touch panels 10 in FIG. 29 to FIG. 31 can also have the stacking layer structure of the first variant embodiment or the single layer structure of the second variant embodiment.

To sum up, in the touch panel, the touch display device, and the manufacturing method of the touch panel of the present invention, the connecting bridges include the patterned silver sulfide layer disposed on the surface of the patterned metal layer. Since the color of silver sulfide is black and the reflectivity of silver sulfide is low, the problem of visual effect of the touch panel brought by the conventional metal connecting bridges and their high reflectivity can be solved. Further, the patterned metal layer included in each of the connecting bridges makes the connecting bridges have a lower resistance. Additionally, in the method of forming the connecting bridges in this invention, silver is used as one of the materials in the metal layer for forming the connecting bridges, wherein the layer which contains silver is the top one in the metal layer. The sulfur contained photoresist material is used in the following photolithography process, such that the silver sulfide layer can be formed between the photoresist layer and the metal layer due to the characteristic of strong reactivity between silver and sulfur. Accordingly, the method of forming the connecting bridges in this invention does not increase the difficulty or the amount of processes comparing to the conventional method.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A manufacturing method of a touch panel, comprising following steps:
   providing a substrate;
   forming a plurality of sensing electrodes on the substrate, wherein the sensing electrodes comprise a plurality of first sensing electrodes; and
   forming a plurality of connecting bridges on the substrate, comprising:
   forming a metal layer on the substrate, wherein a material of the metal layer comprises silver;
   forming a photoresist layer on a surface of the metal layer, wherein a material of the photoresist layer comprises sulfur; and
   forming a patterned silver sulfide layer by performing a photolithography process and an etching process on the photoresist layer and the metal layer, respectively, wherein the patterned silver sulfide layer comprises silver sulfide formed by a reaction between the silver and the sulfur, after the photoresist layer is formed;
   wherein adjacent two of the first sensing electrodes are electrically connected through at least one of the connecting bridges.

2. The manufacturing method of the touch panel of claim 1, wherein the photoresist layer is a positive photoresist layer.

3. The manufacturing method of the touch panel of claim 1, wherein the metal layer comprises a silver layer.

4. The manufacturing method of the touch panel of claim 3, wherein the metal layer further comprises at least one metallic material layer, and the silver layer is disposed between the at least one metallic material layer and the photoresist layer after the step of forming the photoresist layer on the surface of the metal layer.

5. The manufacturing method of the touch panel of claim 4, wherein the at least one metallic material layer comprises an aluminum layer and a molybdenum layer.

6. The manufacturing method of the touch panel of claim 1, further comprising forming a plurality of insulating islands before the step of forming the connecting bridges, wherein the step of forming the sensing electrodes is performed before the step of forming the insulating islands, and each of the connecting bridges partially covers a corresponding insulating island.

7. The manufacturing method of the touch panel of claim 1, further comprising forming a patterned insulating layer after the step of forming the sensing electrodes, wherein the step of forming the connecting bridges is performed after the step of forming the patterned insulating layer, the patterned insulating layer comprises a plurality of contact holes disposed on the first sensing electrodes, and each of the connecting bridges is electrically connected to two of the first sensing electrodes through two of the contact holes.

8. The manufacturing method of the touch panel of claim 1, wherein the sensing electrodes further comprise a plurality of second sensing electrodes, wherein the first sensing electrodes are transmitter electrodes and the second sensing electrodes are receiver electrodes, or the first sensing electrodes are receiver electrodes and the second sensing electrodes are transmitter electrodes.

9. The manufacturing method of the touch panel of claim 1, wherein the step of forming the sensing electrodes comprises forming a patterned transparent conductive layer, and the patterned transparent conductive layer comprises the sensing electrodes.

10. The manufacturing method of the touch panel of claim 9, wherein a material of the patterned transparent conductive layer comprises indium tin oxide, indium zinc oxide, or aluminum zinc oxide.

11. The manufacturing method of the touch panel of claim 9, wherein the sensing electrodes further comprise a plurality of second sensing electrodes, the patterned transparent conductive layer further comprises a plurality of connecting lines, and adjacent two of the second sensing electrodes are electrically connected through at least one of the connecting lines.

* * * * *